(12) United States Patent
Hirohata et al.

(10) Patent No.: US 8,675,973 B2
(45) Date of Patent: Mar. 18, 2014

(54) SIGNAL CLASSIFICATION APPARATUS

(75) Inventors: Makoto Hirohata, Kanagawa-ken (JP); Tomoyuki Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 784 days.

(21) Appl. No.: 12/923,277

(22) Filed: Sep. 13, 2010

(65) Prior Publication Data

US 2011/0222785 A1 Sep. 15, 2011

(30) Foreign Application Priority Data

Mar. 11, 2010 (JP) ................ P2010-055103

(51) Int. Cl.
*G06K 9/62* (2006.01)
(52) U.S. Cl.
USPC ........................................... 382/224
(58) Field of Classification Search
USPC ......... 382/128, 224, 104, 103, 132, 190, 176; 348/169, 36
See application file for complete search history.

(56) References Cited

U.S. PATENT DOCUMENTS 7,756,341 B2 * 7/2010 Perronnin .............. 382/224

FOREIGN PATENT DOCUMENTS

WO 2007-092756 8/2007

OTHER PUBLICATIONS

Cheng, "Mean Shift, Mode Seeking, and Clustering", *Proc. IEEE Transactions on Pattern Analysis and Machine Intelligence*, vol. 17, No. 8, pp. 790-799, 1995.
Sheikh et al., "Mode-seeking by Medoidshifts", *Proc. IEEE International Conference on Computer Vision*, 8 pages, 2007.
Koontz et al., "A Graph-Theoretic Approach to Nonparametric Cluster Analysis", *Proc. IEEE Transactions on Computer*, vol. c-25, No. 9, pp. 936-944, 1976.
Vedaldi et al., "Quick Shift and Kernal Methods for Mode Seeking", *ECCV2008, part.IV, LNC.5530*, pp. 1-14, 2008.
Yoshikazu, Yano et al., "A Study on Automatic Filter Construction for Feature Extraction"; Journal of the Institute of Electrical Engineers of Japan; vol. 123 No. 9; Sep. 1, 2003; pp. 1564-1572.
Office Action dated Jan. 12, 2012 in JP Application No. 2010-055103 with English-language translation.

* cited by examiner

*Primary Examiner* — Chan S Park
*Assistant Examiner* — Elisa Rice
(74) *Attorney, Agent, or Firm* — Nixon & Vanderhye, P.C.

(57) ABSTRACT

An acquisition unit acquires feature vectors (the number is N). A first selection unit selects first neighbor features (k ($1 \leq k \leq N$)) of each feature vector in order of higher similarity from the feature vectors. A second selection unit generates a plurality of groups each including similar feature vectors from the feature vectors, and selects second neighbor features (u ($1 \leq k+u \leq N-2$)) of each feature vector in order of higher similarity. Each of the second neighbor features is differently included in a group. A determination unit calculates a density of each feature vector by using a threshold, the first neighbor features and the second neighbor features, and determines feature vectors to be classified into the same class as each feature vector by using the density and a threshold. A classification unit classifies the feature vectors into a plurality of classes by using the selection result. A control unit controls each threshold.

12 Claims, 25 Drawing Sheets

FEATURE VECTOR Xv INCLUDED IN A CLUSTER RFi OF THE FIRST NEIGHBOR FEATURE OF FEATURE VECTOR Xi (NUMBER OF FEATURE VECTOR Xv : k=1) — 03

| xi | x0 | x1 | x2 | x3 | x4 | x5 | x6 |
|---|---|---|---|---|---|---|---|
| xv∈RFi | x1 | x2 | x1 | x4 | x3 | x4 | x1 |
| S(i, v) | 0.8 | 0.9 | 0.9 | 0.9 | 0.9 | 0.7 | 0.6 |

FEATURE VECTOR Xh INCLUDED IN A CLUSTER RSi OF THE SECOND NEIGHBOR FEATURE OF FEATURE VECTOR Xi (NUMBER OF FEATURE VECTOR Xh : u=1)

| xi | x0 | x1 | x2 | x3 | x4 | x5 | x6 |
|---|---|---|---|---|---|---|---|
| xh∈RSi | x6 | x4 | x4 | x5 | x5 | x4 | x1 |
| S(i, h) | 0.6 | 0.4 | 0.5 | 0.6 | 0.7 | 0.7 | 0.6 |

DENSITY OF FEATURE VECTOR Xi (THRESHOLD ths=0.7) — 04

| xi | x0 | x1 | x2 | x3 | x4 | x5 | x6 |
|---|---|---|---|---|---|---|---|
| Pi | 0.73 | 0.90 | 0.93 | 0.98 | 1.08 | 0.55 | 0.25 |

TABLE : FEATURE VECTOR y(xi) INTO WHICH FEATURE VECTOR Xi IS CLASSIFIED (THRESHOLD thc=0.7) — 05

| xi | x0 | x1 | x2 | x3 | x4 | x5 | x6 |
|---|---|---|---|---|---|---|---|
| y(xi) | x1 | x2 | x2 | x4 | X4 | X4 | x6 |

SCREEN 5

LIST OF SONGS SIMILAR TO SONG A

| ORDER | SIMILARITY | SONG NAME | LENGTH |
|---|---|---|---|
| 1 | 0.93 | SONG F | 0:03:35 |
| 2 | 0.90 | SONG C | 0:03:39 |
| 3 | 0.82 | SONG G | 0:05:21 |
| 4 | 0.79 | SONG R | 0:02:45 |
| 5 | 0.78 | SONG N | 0:03:17 |

FIG. 23

SIGNAL CLASSIFICATION APPARATUS

CROSS-REFERENCE TO RELATED APPLICATION

This application is based upon and claims the benefit of priority from Japanese Patent Application No. 2010-055103, filed on Mar. 11, 2010; the entire contents of which are incorporated herein by reference.

FIELD

Embodiments described herein relate generally to an apparatus for classifying signals as targets for identification.

BACKGROUND

As to clustering technique (signal classification technique), a cluster (set) of samples as targets for identification is classified into each class (subset) of samples having similar feature. For example, this clustering technique is applied to processing to identify targets such as characters, figures, or speeches. As to a face image as a target for identification, if the face image is correctly identified, one class includes only face images of the same person, and each class comprises speech data of different speaker. In order to realize this identification processing with high accuracy, not only feature extraction but also clustering is important.

In non-patent references 1~3, clustering is performed on the assumption that samples belonging to the same class are closely distributed in a feature space. Concretely, a feature of each sample is updated to a center of distribution of classes (potentially existing) neighboring the sample. By collecting samples belonging to the same class at one position, clustering is realized. In non-patent reference 1, each sample is updated to be most similar to a mean feature of samples (neighbor samples) of which similarity between features thereof is above a threshold. In this case, as to calculation of the mean feature, the higher the number of dimensions of the feature space is, the more the calculation load increases.

In non-patent references 2 and 3, how each sample is near a center of distribution of classes (potentially existing) is represented by a density surrounding each sample. For example, the density is approximated as the number of adjacent samples. Each sample is updated to have a high density and the most similarity above a threshold. The feature is updated using the density. Accordingly, in comparison with non-patent reference 1, the calculation load can be reduced.

As to non-patent references 2 and 3, in order for each sample to execute calculation processing of density and determination processing of samples classified into the same class, similarity between samples is necessary. These two processing cannot be executed simultaneously. In order to effectively execute two processing without overlapping the operation, similarity information between two samples of all combinations need be stored into a memory (buffer). Accordingly, a memory having large capacity (square-order of the number of samples) is necessary.

Furthermore, in order to effectively calculate density of each sample, sample ID and similarity (above a threshold) of neighbor samples may be stored. However, the number of neighbor samples cannot be previously predicated. In addition to this, if the threshold is minimum, all samples can be neighbor samples of each sample. Accordingly, even if the sample ID and the similarity are stored, a memory having square-order of the number of samples is necessary.

[Non-patent reference 1] "Mode-seeking by Medoidshifts", Y. A. Sheikh, E. A. Khan and T. Kanade, IEEE International Conference on Computer Vision, 2007.

[Non-patent reference 2] "A Graph-theoretic approach to nonparametric cluster analysis", W. L. G. Koontz, P. Narendra, and K. Fukunaga, IEEE Trans. on Computer, c-25 (9), 1976.

[Non-patent reference 3] "Quick Shift and Kernel Methods for Mode Seeking", A. Vedaldi and S. Soatto, ECCV2008, PartIV, LNCS5305, pp. 705-718, 2008.

BRIEF DESCRIPTION OF THE DRAWINGS

FIG. 5 is a second operation example of the clustering processing.

FIG. 23 is a second display example of clustering processing result of songs according to the third embodiment.

DETAILED DESCRIPTION

Figure 1:
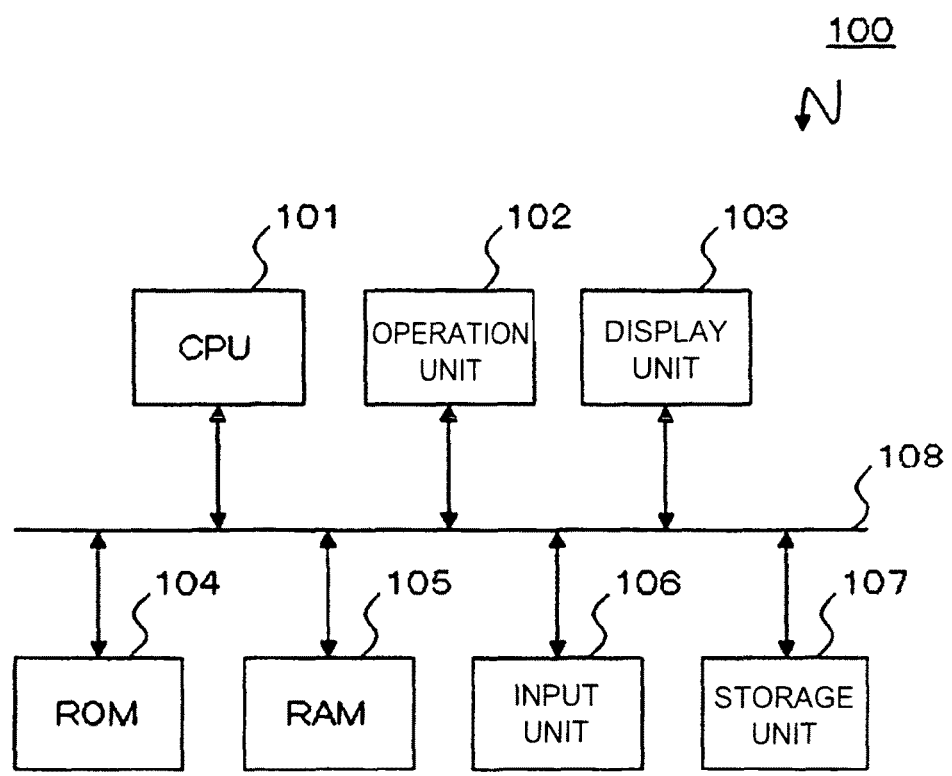
FIG. 1 is a hardware component of a signal classification apparatus according to the first embodiment.

In general, according to one embodiment, a signal classification apparatus includes an acquisition unit, a first selection unit, a second selection unit, a determination unit, a classification unit and a control unit. The acquisition unit is configured to acquire feature vectors (the number is N) of targets for identification from an input signal. The first selection unit is configured to select first neighbor features (the number is k ($1 \leq k \leq N$)) of each feature vector in order of higher similarity from the feature vectors. The second selection unit is configured to generate a plurality of groups from the feature vectors, and to select second neighbor features (the number is u ($1 \leq k+u \leq N-2$)) of each feature vector in order of higher similarity from the plurality of groups. Each group includes feature vectors of which similarity is above a first threshold. Each of the second neighbor features is differently included in a group. The determination unit is configured to calculate a density of each feature vector by using a second threshold, the first neighbor features and the second neighbor features, and to select feature vectors to be classified into the same class as each feature vector from the first neighbor features and the second neighbor features, by using the density and a third threshold. The classification unit is configured to classify the feature vectors of targets into a plurality of classes by using a selection result of the determination unit. The control unit is configured to control the second threshold and the third threshold.

Hereinafter, embodiments of the present invention will be explained by referring to the drawings. The present invention is not limited to the following embodiments.

As to a signal classification apparatus of the embodiments, a subject (For example, a person) included in an image can be classified, or a sound (For example, a song or a person's voice) can be classified. The classification result is used for classifying photographs including each subject, or classifying utterances of each person. Accordingly, the signal classification apparatus can be applied to a retrieval system of photographs or video, or a theme for photo slide show.

The First Embodiment

First, a hardware component of the signal classification apparatus is explained by referring to FIG. 1. A signal classification apparatus 100 includes a CPU (Central Processing Unit) 101 to control all of the apparatus, a ROM (Read Only Memory) 104 or a RAM (Random Access Memory) 105 to store various data and various programs, an external storage unit 107 such as a HDD (Hard Disk Drive) or a CD (Compact Disk) drive to store various data and various programs, and a bus 108, i.e., the hardware component using a regular computer. Furthermore, in the signal classification apparatus 100, a display unit 103 to display an image, an operation unit 102 (such as a keyboard or a mouse) to accept an indication input of a user, an input unit 106 to convert targets for identification (such as characters, images, or sounds) to electronic signals, and a communication unit or an I/F (Interface) to control communication with an external apparatus, are connected with wired or wirelessly.

The CPU 101 executes various processing in cooperation with various control programs (previously stored in the ROM 104) using a predetermined region of the RAM 105 as a working region, and generally controls operation of each unit of the signal classification apparatus 100. Furthermore, in cooperation of a predetermined program (stored in the ROM 104), the CPU 101 realizes each function of an acquisition unit 10, a selection unit 11, a determination unit 12, a classification unit 13, and a control unit 14 (each unit is explained afterward). The operation unit 102 having various input keys, accepts input information (operated by a user) as an input signal, and outputs the input signal to the CPU 101.

The display unit 103 is composed by a display means such as a liquid crystal display apparatus (LCD), and displays various information based on a display signal from the CPU 101. Moreover, the display unit 103 and the operation unit 102 may form a touch panel as one body.

The ROM 104 stores programs and various setting information (to control the signal classification apparatus) under non-rewritable condition. The RAM 105 is a memory means (such as a SDRAM), which functions as a working region (such as a buffer) of the CPU 101.

The input unit 106 converts targets for identification (characters, speeches, or figures) to electronic signals, and outputs the electronic signals as numerical data such as a PCM (Pulse Code Modulation).

The storage unit 107 has a memory medium (storable magnetically or optically), which stores signals acquired via the input unit 106, or signals input from the outside via the communication unit or I/F (not shown in FIG. 1). Furthermore, the storage unit 107 stores classification result information of targets for identification by clustering processing (explained afterward).

Figure 2:
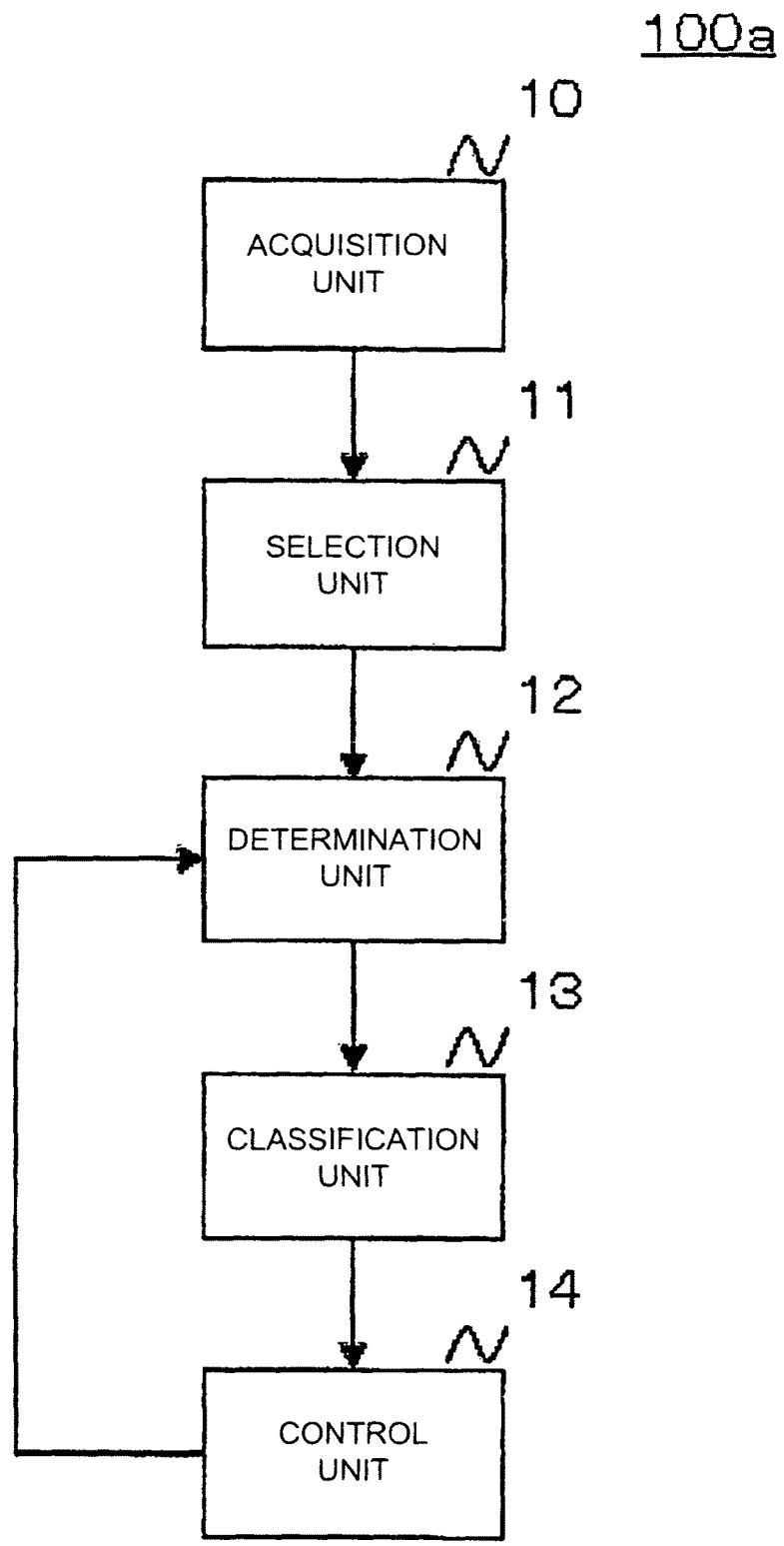
FIG. 2 is a block diagram of the signal classification apparatus according to the first embodiment.

As shown in FIG. 2, the signal classification apparatus 100a includes the acquisition unit 10, the selection unit 11 having a first selection unit and a second selection unit, the determination unit 12, the classification unit 13, and the control unit 14.

The acquisition unit 10 acquires a feature vector of a target for identification included in a signal (input via the input unit 106). The feature vector represents characteristic to identify the signal of the target (such as a person or a face included in the image, or a voice in sound). If the target is a face image to be classified into each person, the feature vector is calculated by converting a vector representing pixel values. As this conversion, for example, histogram equalization is used. If the target is speech to be classified into each speaker, for example, cepstrum-feature vector such as LPC cepstrum or MFCC is acquired. Furthermore, the cepstrum-feature vector may be modified using the method described in "Unsupervised Speaker Indexing using Anchor Models and Automatic Transcription of Discussions", Y. Akita, ISCA 8th European Conference on Speech Communication and Technology (Euro Speech), September 2003.

Furthermore, the number of speech as the target may be increased by dividing the speech at each unvoiced part or at a predetermined interval. If the target for identification is whole sound to be classified into sound type (such as music, speech, noise), the method described in "Construction and Evaluation of a Robust Multifeature Speech/Music Discriminator", E. Scheirer, IEEE International Conference on Acoustic Speech, and Signal Processing, April 1997, may be used. The feature vector acquired by the acquisition unit 10 is output to the selection unit 11.

The selection unit 11 includes a first selection unit and a second selection unit. As to each feature vector (the number thereof is N) acquired by the acquisition unit 11, the first selection unit selects first neighbor features (the number thereof is k ($1 \leq k \leq N$)) from the feature vectors. The second selection unit generates a plurality of groups each including similar feature vectors, and selects second neighbor features (the number thereof is u) each belonging to different groups. Each group represents a cluster of similar features selected from feature vectors acquired by the acquisition unit 10 (Hereinafter, this group is called a group of features). Generation of the group may be simple processing to be orderly executed during calculation of similarity between feature vectors. The selection unit 11 generates a plurality of groups of features using the feature vectors (the number thereof is N) acquired. The selection unit 11 outputs the first neighbor feature and the second neighbor feature to the determination unit 12.

By referring to a threshold to compare similarity therewith, the determination unit 12 calculates a density of each feature vector using the first neighbor feature and the second neighbor feature. Next, the determination unit 12 determines another feature vector classified into the same class (cluster) as each feature vector, from the first neighbor features and the second neighbor features. Furthermore, the determination unit 12 creates a table to refer feature vectors related to each feature vector, and outputs the table to the classification unit 13. The feature vectors related to each feature vector had better be output as a table format. However, a format to discriminate the feature vectors (selected from the first neighbor features and the second neighbor features) may be output.

By referring to the table (created by the determination unit 12), the classification unit 13 assigns a class ID to each feature vector. The class ID is uniquely assigned to the same class to which feature vectors belong. Assignment result of class ID is output to the control unit 14.

The control unit 14 controls a threshold used by the determination unit 12. When the threshold is changed to a different value, the control unit 14 outputs the threshold (as a changed value) to the determination unit 12. After acquiring the threshold (output from the control unit 14), the determination unit 12 creates a table again.

Next, operation of the signal classification apparatus 100 of the first embodiment is explained by referring to FIGS. 3~6. First, a signal (as a target for identification) is input via the input unit 106 (S101 in FIG. 3). The acquisition unit 10 acquires feature vectors from the target (S102 in FIG. 3, operation example O1 in FIG. 4). The acquisition unit 10 outputs the feature vectors to the selection unit 11.

Figure 3:
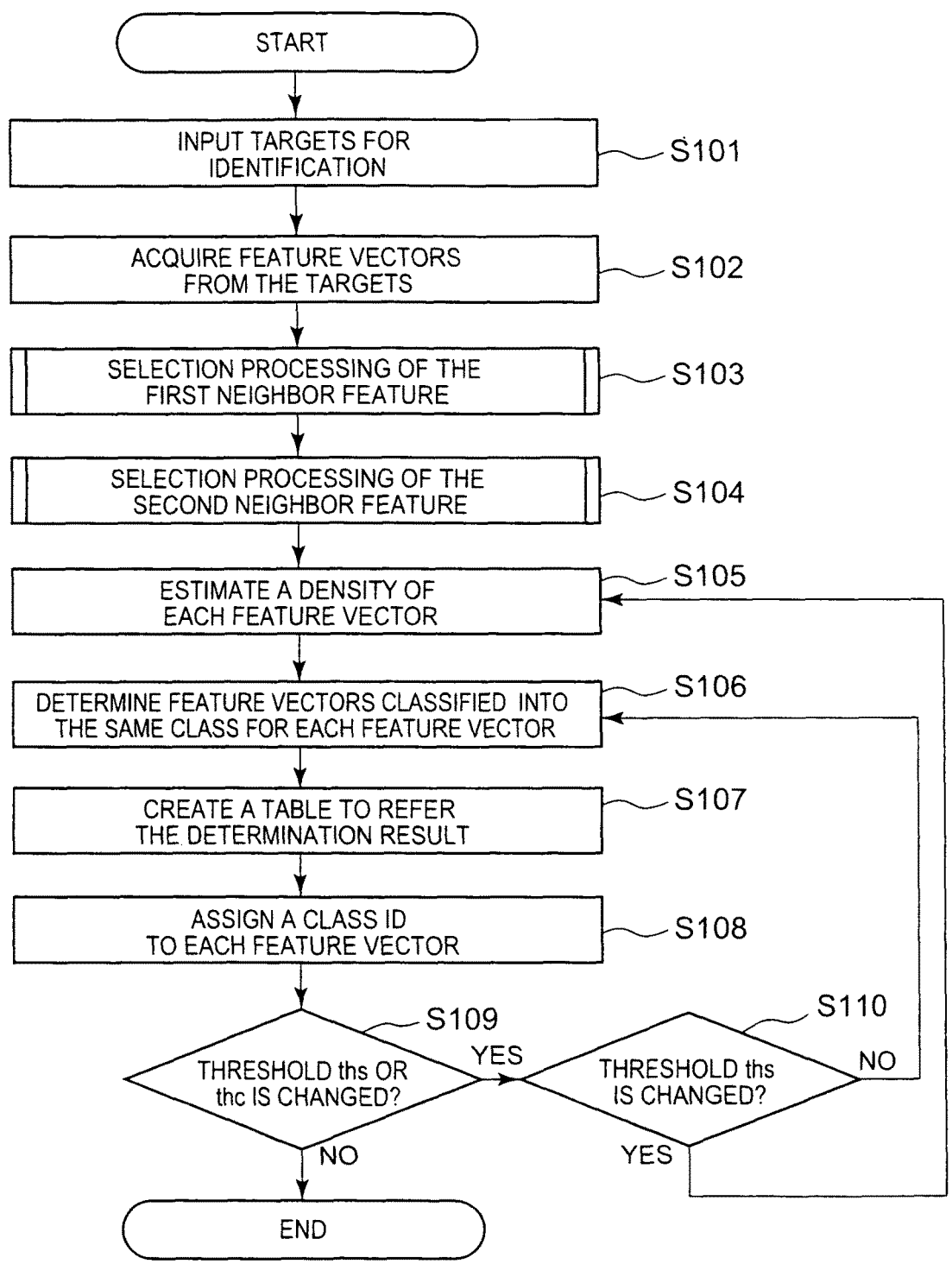
FIG. 3 is a flow chart of clustering processing according to the first embodiment.
Figure 4:
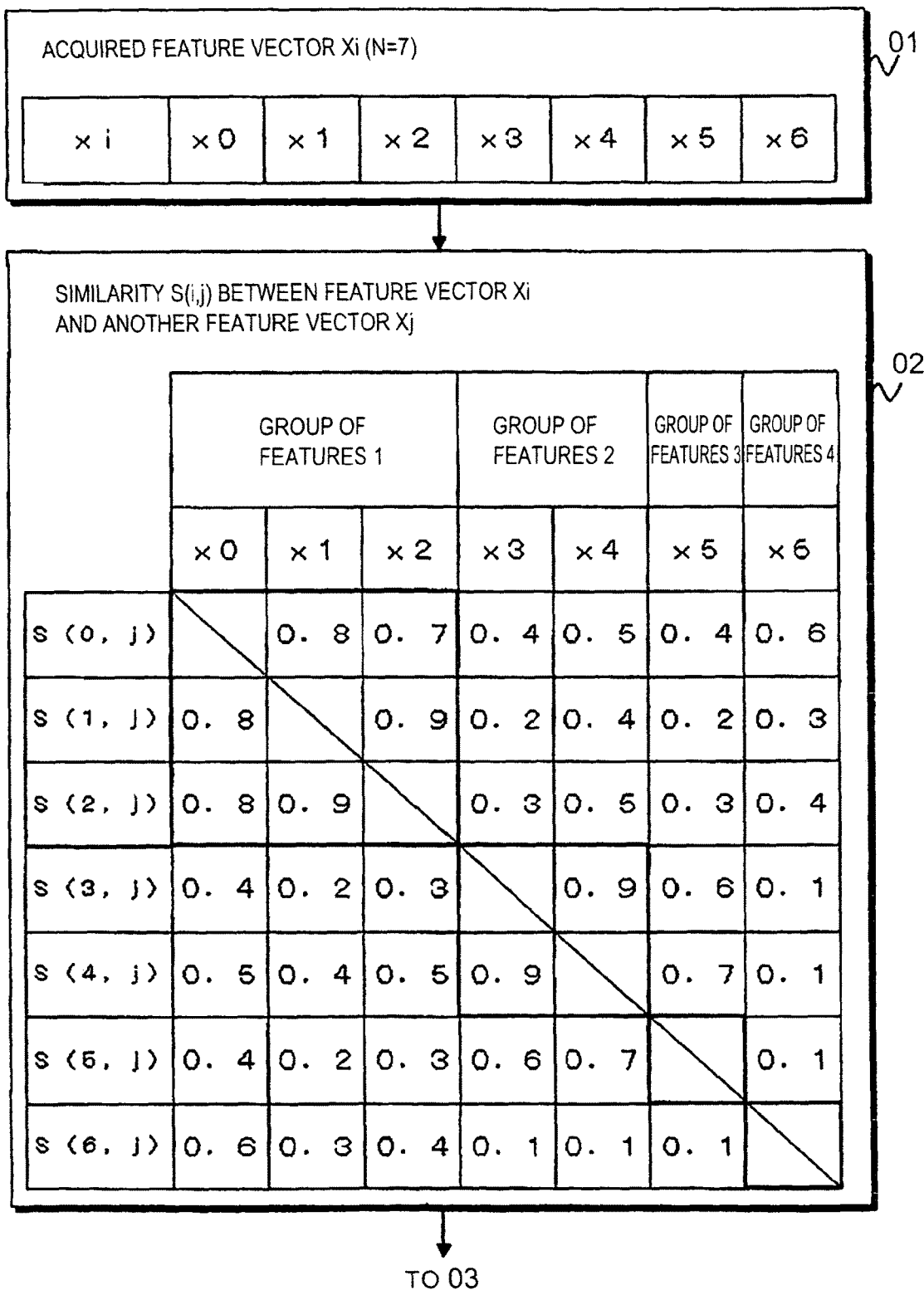
FIG. 4 is a first operation example of the clustering processing.

Next, the selection unit 11 executes selection processing of first neighbor feature (to select a first neighbor feature of each feature vector) (S103 in FIG. 3). As the first neighbor feature of a first vector xi, feature vectors (the number thereof is k) having higher similarity with the first vector xi are selected (operation example O2 in FIG. 4 and operation example O3 in FIG. 5).

Figure 7:
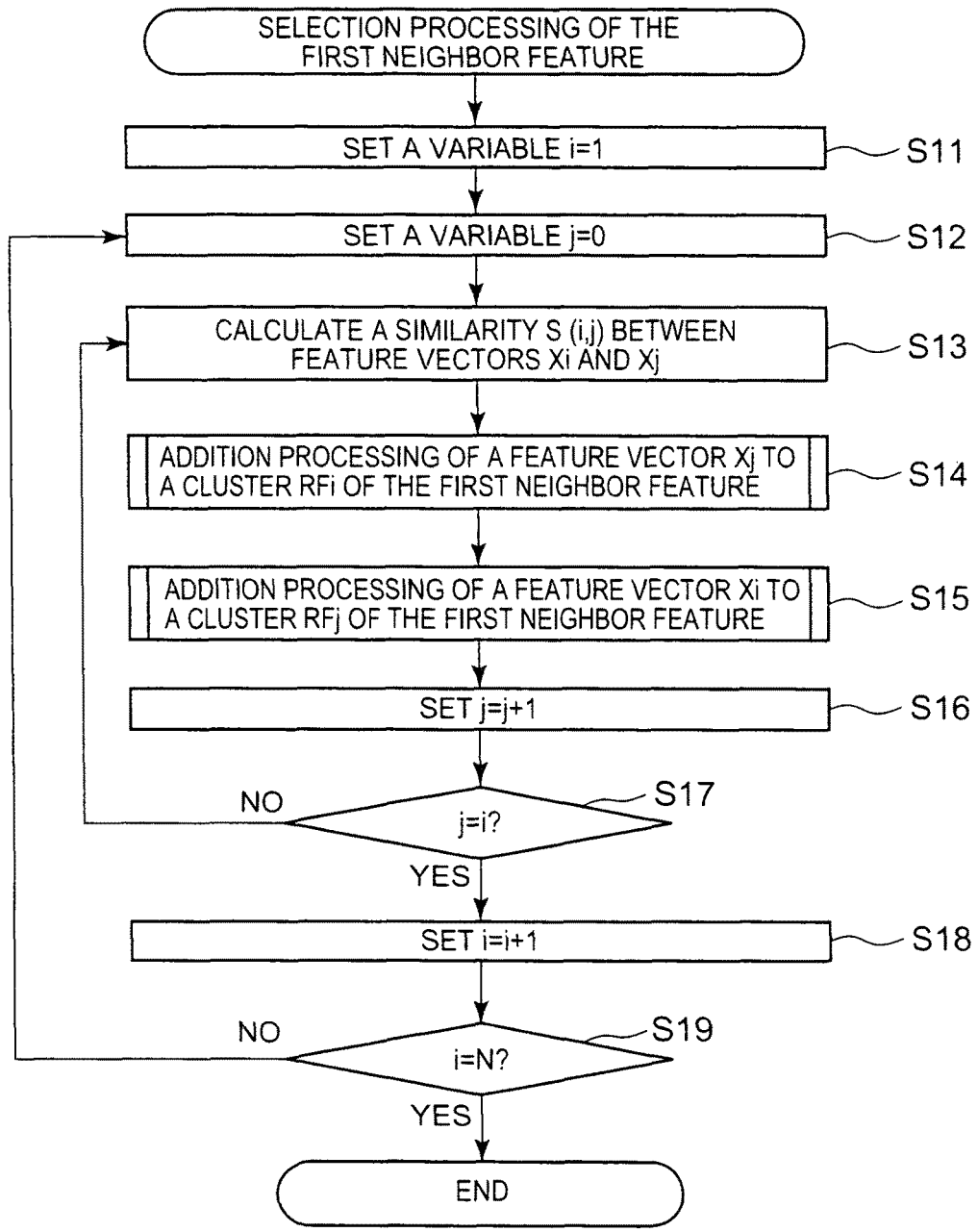
FIG. 7 is a flow chart of selection processing of a first neighbor feature in FIG. 3.

Next, detail operation of the selection processing of first neighbor feature (S103) is explained by referring to FIG. 7. The feature vector acquired by the acquisition unit 10 is represented as xi (i=0, 1, . . . , N−1).

First, the first selection unit sets a variable i=1 as a reference number of feature vector to refer a second feature vector x1 (S11). In the same way, the first selection unit sets a variable j=0 to refer a first feature vector x0 (S12).

Next, the selection unit 11 calculates a similarity S(i,j) between feature vectors xi and xj (S13). The similarity is represented as a vector. The similarity may be represented as a reciprocal number of a Euclidean distance between two feature vectors, or a value subtracted the Euclidean distance from maximum. Furthermore, the similarity may be a cosine of an angle of an inner product between two feature vectors.

Figure 8:
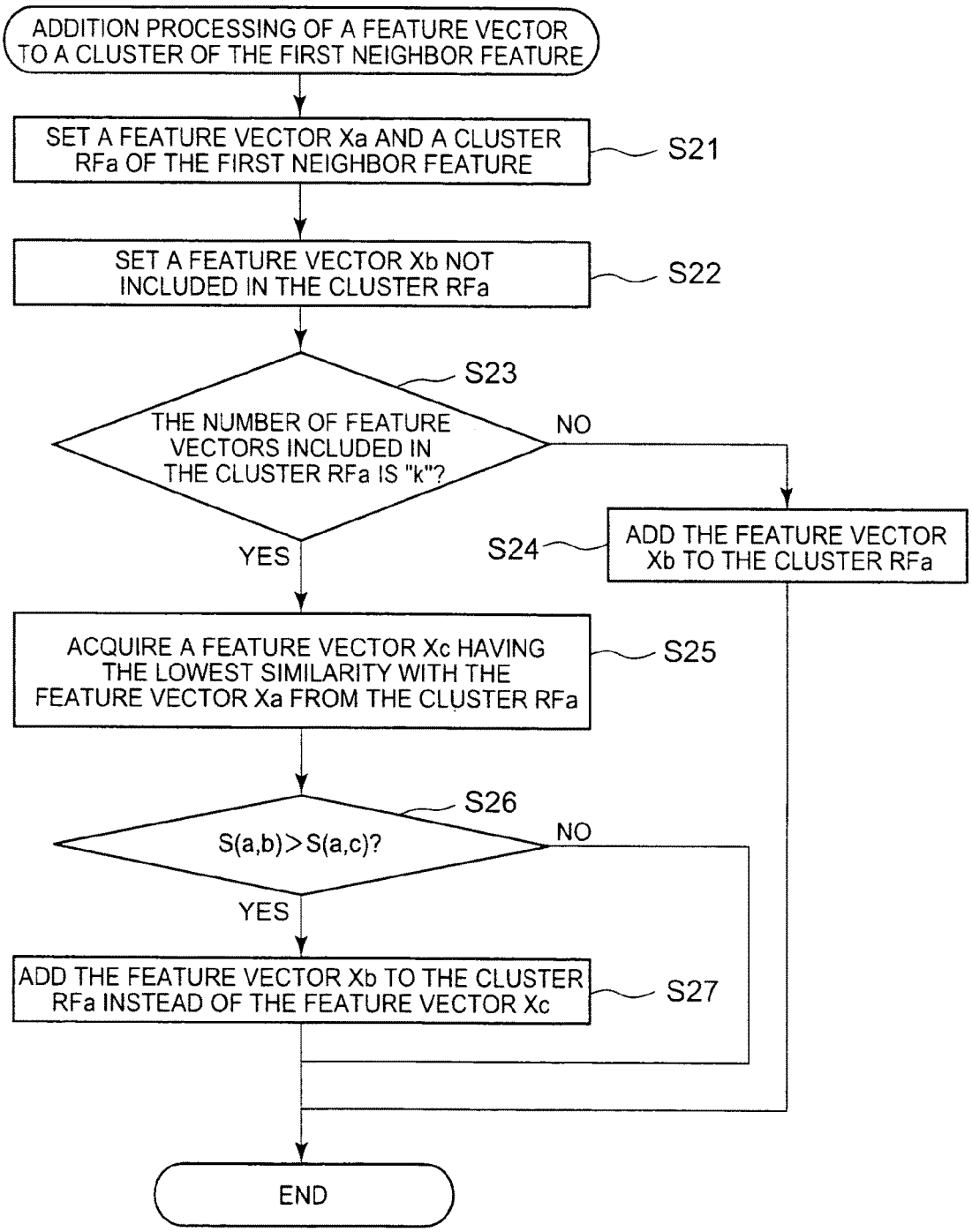
FIG. 8 is a flow chart of feature-addition processing to the first neighbor feature in FIG. 7.

Next, the first selection unit decides whether the feature vector xj is added to a cluster RFi of first neighbor feature of the feature vector xi, and executes feature-addition processing to the cluster of first neighbor feature by targeting the cluster RFi and the feature vector xj (S14). Detail operation of the feature-addition processing is explained by referring to FIG. 8.

The first selection unit sets the feature vector xi as a feature vector xa of processing target, and the cluster RFi as a cluster RFa of first neighbor feature (S21). Next, the first selection unit sets the feature vector xj as a feature vector xb to be decided whether to add to the cluster RFa (S22).

Next, the first selection unit enumerates the number of feature vectors included in the cluster RFa of first neighbor feature of the feature vector xa (S23). If the number of the feature vectors is "k" (Yes at S23), processing is forwarded to S25. If the number of the feature vectors is not "k" (No at S23), the feature vector xb is added to the cluster RFa (S24), and processing is completed.

The first selection unit acquires a feature vector xc having the lowest similarity with the feature vector xa from the cluster RFa (S25). Next, a similarity S(a,b) between feature vectors xa and xb is compared with a similarity S(a,c) between feature vectors xa and xc (S26). If S(a,b) is larger than S(a,c) (Yes at S26), the feature vector xb is added to the cluster RFa instead of the feature vector xc (S27), and processing is completed. If S(a,b) is not larger than S(a,c) (No at S26), processing is completed.

Next, the first selection unit decides whether the feature vector xi is added to a cluster RFj of first neighbor feature of the feature vector xj, and executes feature-addition processing to the cluster of first neighbor feature by targeting the cluster RFj and the feature vector xi. This feature-addition processing can be executed in the same way as S14 except for S21 and S22. At S21, the feature vector xj is set as a feature vector xa, and the cluster RFj is set as a cluster RFa. Furthermore, at S22, the feature vector xi is set as a feature vector xb.

Detail operation of the selection processing of first neighbor feature is explained again by referring to FIG. 7. The first selection unit sets "j=j+1" to refer a next feature vector to be calculated a similarity with the feature vector xi (S16). Next, the first selection unit decides whether the next feature vector xj is same as the feature vector xi (S17). If the next feature vector xj is same as the feature vector xi (Yes at S17), processing is forwarded to S18. If the next feature vector xj is different from the feature vector xi (No at S17), processing is returned to S18 to calculate the similarity.

In order to refer a next feature vector, the first selection unit sets "i=i+1" (S18), and decides whether processing S12~S18 is executed for all feature vectors acquired (S19). If the processing S12~S18 is completed for all feature vectors (Yes at S19), processing is completed. If the processing S12~S18 is not completed for all feature vectors (No at S19), processing is returned to S12.

Figure 9:
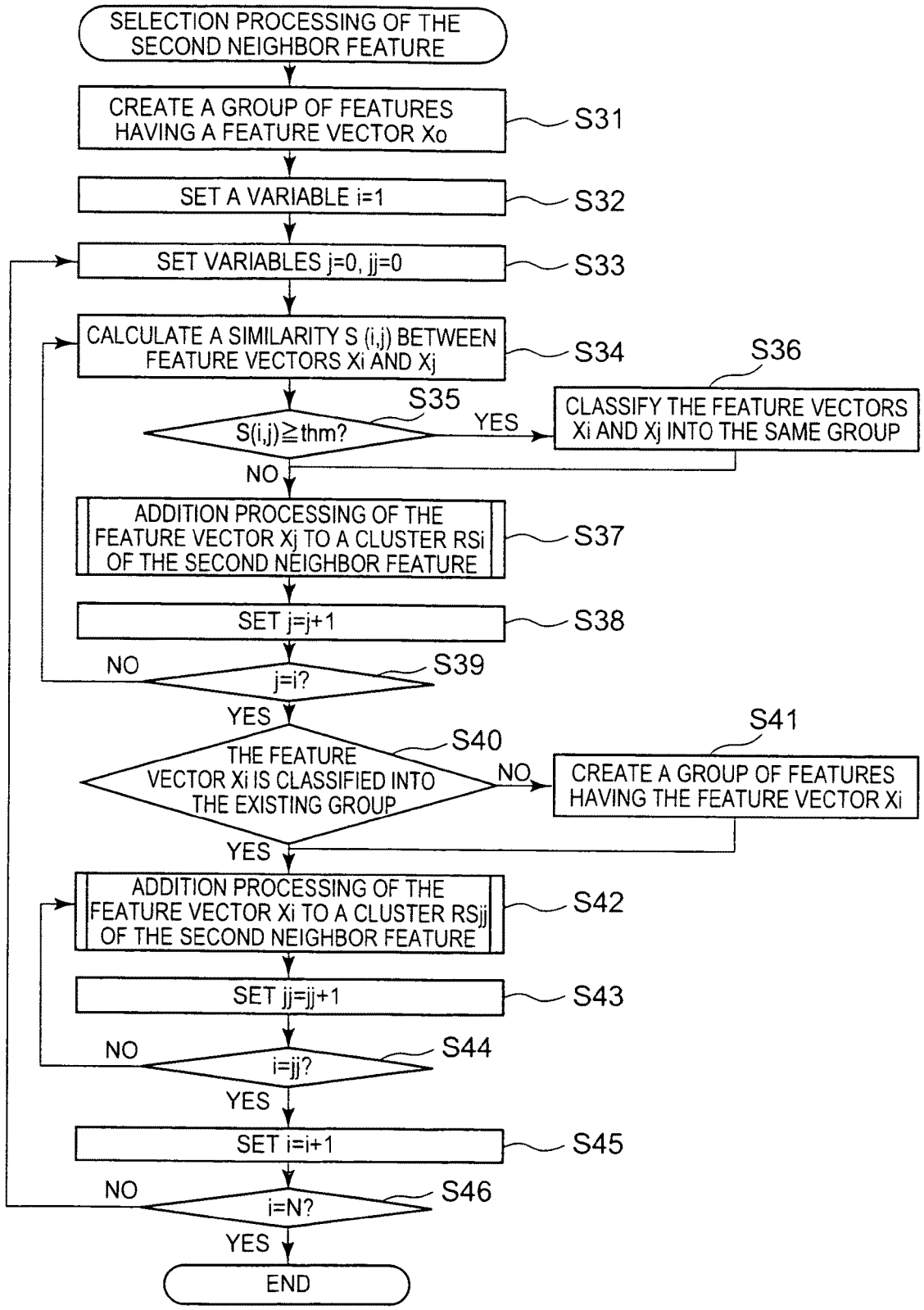
FIG. 9 is a flow chart of selection processing of a second neighbor feature in FIG. 3.

Next, selection processing of second neighbor feature (following from the selection processing of first neighbor feature) is explained by referring to FIG. 3. The selection unit 11 executes selection processing of second neighbor feature (to select a second neighbor feature of each feature vector) (S104 in FIG. 3). The second neighbor feature of a feature vector x represents feature vectors (the number thereof is u) having a higher similarity with the feature vector x, and the feature vectors (the number thereof is u) respectively belong to different group of features (operation example O2 in FIG. 4 and operation example O3 in FIG. 5). As mentioned-above, the group of features is a cluster having similar feature vectors. In this case, detail operation of the selection processing of second neighbor feature is explained by referring to FIG. 9.

First, the second selection unit newly creates a group of features having a first feature vector x0 (S31). Next, the second selection unit sets a variable i=1 as a reference number of feature vector to refer a second feature vector (S32). In the same way, the second selection unit sets variables j=0 and jj=0 to refer a first feature vector (S33).

Next, in the same way as S11, the second selection unit calculates a similarity S(i,j) between similarities xi and xj (S34). Next, the second selection unit decides whether the similarity S(i,j) is larger than a threshold thm, i.e., whether the feature vectors xi and xj are classified into the same group of features (S35). In order to set the threshold thm as a sufficient reliable value, for example, if maximum of the similarity is 1, the threshold thm is set to 0.9. If the similarity S(i,j) is larger than the threshold thm (Yes at S35), the feature vector xi is classified into the same class as the feature vector xj (S36), and processing is forwarded to S37. If the similarity S(i,j) is not larger than the threshold thm (No at S35), processing is forwarded to S37.

Figure 10:
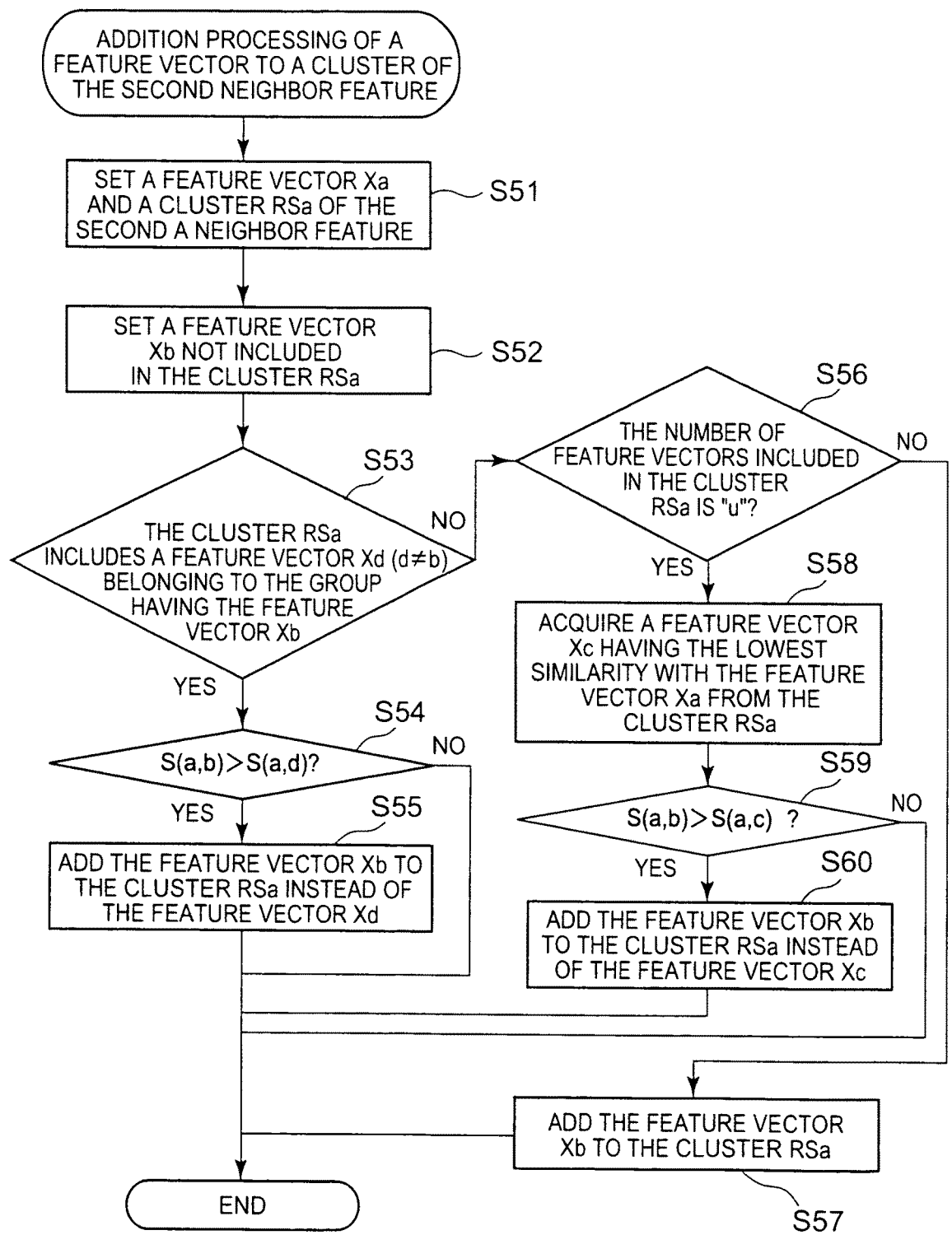
FIG. 10 is a flow chart of feature-addition processing to the second neighbor feature in FIG. 9.

Next, the second selection unit decides whether the feature vector xj is added to a cluster RSi of second neighbor feature of the feature vector xi, and executes feature-addition processing to the cluster of second neighbor feature by targeting the cluster RSi and the feature vector xj. Detail operation of the feature-addition processing is explained by referring to FIG. 10.

The second selection unit sets the feature vector xi as a feature vector xa of processing target, and the cluster RSi as a cluster RSa of second neighbor feature (S51). Next, the second selection unit sets the feature vector xj as a feature vector xb to be decided whether to add to the cluster RSa (S52).

Next, the second selection unit decides whether a feature vector xd (belonging to the same class as the feature vector xb) is included in the cluster RSa (S53). If the feature vector xd is included (Yes at S53), processing is forwarded to S54. At S54, a similarity S(a,b) between feature vectors xa and xb is compared with a similarity S(a,d) between feature vectors xa and xd. If S(a,b) is larger than S(a,d) (Yes at S54), the feature vector xb is added to the cluster RSa instead of the feature vector xd (S55), and processing is completed. If S(a,b) is not larger than S(a,d) (No at S54), processing is completed. If the feature vector xd is not included in the cluster RSa (No at S53), processing is forwarded to S56.

Next, the second selection unit enumerates the number of feature vectors included in the cluster RSa of second neighbor feature of the feature vector xa (S56). If the number of the feature vectors is "u" (Yes at S56), processing is forwarded to S58. If the number of the feature vectors is not "u" (No at S56), the feature vector xb is added to the cluster RSa (S57), and processing is completed.

The second selection unit acquires a feature vector xc having the lowest similarity with the feature vector xa from the cluster RSa (S58). Next, a similarity S(a,b) between feature vectors xa and xb is compared with a similarity S(a,c) between feature vectors xa and xc (S59). If S(a,b) is larger than S(a,c) (Yes at S59), the feature vector xb is added to the cluster RSa instead of the feature vector xc (S60), and processing is completed. If S(a,b) is not larger than S(a,c) (No at S59), processing is completed.

Detail operation of the selection processing of second neighbor feature is explained again by referring to FIG. 9. The second selection unit sets "j=j+1" to refer a next feature vector to be calculated a similarity with the feature vector xi (S38). Next, the second selection unit decides whether the next feature vector xj is same as the feature vector xi (S39). If the next feature vector xj is same as the feature vector xi (Yes at S39), processing is forwarded to S40. If the next feature vector xj is different from the feature vector xi (No at S39), processing is returned to S34 to calculate the similarity.

Next, the second selection unit decides whether the feature vector xi is classified into the existing group of features (S40). If the feature vector xi is classified into the existing group (Yes at S40), processing is forwarded to S42. If the feature vector xi is not classified into the existing group (No at S40), a group of features having the feature vector xi is newly created (S41), and processing is forwarded to S42.

Next, the second selection unit decides whether the feature vector xi is added to a cluster RSjj of second neighbor feature of the feature vector xjj, and executes feature-addition processing to the cluster of second neighbor feature by targeting the cluster RSjj and the feature vector xi. This feature-addition processing can be executed in the same way as S37 except for S51 and S52. At S51, the feature vector xjj is set as a feature vector xa, and the cluster RSjj is set as a cluster RSa. Furthermore, at S52, the feature vector xi is set as a feature vector xb.

Next, the second selection unit sets "jj=jj+1" to refer a next cluster of second neighbor feature possibly having the feature vector xi (S43). Next, the first selection unit decides whether the next feature vector xjj is same as the feature vector xi (S44). If the next feature vector xjj is same as the feature vector xi (Yes at S44), processing is forwarded to S45. If the next feature vector xjj is different from the feature vector xi (No at S44), processing is returned to S42 to execute the feature-addition processing to the cluster of second neighbor feature.

In order to refer a next feature vector, the second selection unit sets "i=i+1" (S45), and decides whether processing S33~S45 is executed for all feature vectors acquired (S46). If the processing S33~S45 is completed for all feature vectors (Yes at S46), processing is completed. If the processing S33~S45 is not completed for all feature vectors (No at S46), processing is returned to S33.

At the feature-addition processing of second adjacent feature, the selection unit 11 may add a constraint that the cluster RSi (of second neighbor feature of the feature vector xi) does not include feature vectors belonging to the same class as the feature vector xi. Furthermore, the selection unit 11 may add a constraint that the cluster RSi does not include feature vectors of the cluster RFi of first neighbor feature.

The selection unit 11 may execute the selection processing of first neighbor feature (shown in FIG. 7) and the selection processing of second neighbor feature (shown in FIG. 9) in parallel. When two selection processing is executed in parallel, processing of S11, S12 and S31~S33 is executed in order. Next, after processing to calculate the similarity (S13 or S34) is executed, processing of S14~S17 and S35~S39 is executed in order. Next, after processing of S40~S44 is executed, processing to be related to completion (S18 and S19, or S45 and S46) is desirably executed.

The number "k" of first neighbor features (selected by the selection unit 11) is set to be not smaller than "1" and not larger than "N−2", and the number "u" of second neighbor features is set so that "k+u" is not larger than "N−2". In this case, "k" and "u" may be respectively a fixed value irrespective of "N", or may be increased in proportion to "N". Furthermore, "k" and "u" may be differently determined, or may be the same value. For example, in case of "N=200", "k" and "u" may be set as 1% of "N", i.e., "k=2" and "u=2".

The selection unit 11 outputs the first neighbor feature and the second neighbor feature to the determination unit 12. By referring to a threshold the to compare similarity between feature vectors, the determination unit 12 determines a density of each feature vector using the first neighbor feature and the second neighbor feature (selected by the selection unit 11) (S105 in FIG. 3, operation example O4 in FIG. 5).

For example, the density Pi of feature vector xi (determined by the determination unit 12) is calculated using the threshold the and Gaussian function described in non-patent references 1 and 2. In following equation (1), maximum of similarity is 1, RFi is a cluster of first neighbor feature of feature vector xi, and RSi is a cluster of second neighbor feature of feature vector xi. Furthermore, in the equation (1), α is a weight of second neighbor feature, for example, 0.5.

$$P_i = \sum_{x_j \in RF_i} \exp\left(-\left|\frac{1-S(i,j)}{1-ths}\right|^2\right) + \alpha \sum_{x_j \in RS_i} \exp\left(-\left|\frac{1-S(i,j)}{1-ths}\right|^2\right) \quad (1)$$

Next, the determination unit 12 determines feature vectors classified into the same class as each feature vector from the first neighbor features and the second neighbor features (S106 in FIG. 3), creates a table to refer the determination result (S107 in FIG. 3, operation example O5 in FIG. 5), and outputs the table to the classification unit 13. The table had better be referred with each feature vector. Even if the table has a data format for each target for identification, the data format had better be referred with each feature vector representing the target.

A feature vector y(xi) classified into the same class as the feature vector xi is, in a cluster RFi of first neighbor feature and a cluster RSi of second neighbor feature, a feature vector having the largest similarity with the feature vector xi and a density larger than a density of the feature vector xi. If a feature vector having a density larger than a density of the feature vector xi is not included in clusters RFi and RSi, the feature vector y(xi) is the feature vector xi. Furthermore, by referring to a threshold thc to compare a similarity between feature vectors, if a similarity between feature vectors y(xi) and xi is smaller than the threshold thc, the feature vector y(xi) is corrected as the feature vector xi. In this case, the threshold thc may be equal to the threshold ths, or may be calculated from the threshold ths by linear-transform. Furthermore, the threshold thc may be set independent from the threshold ths. Moreover, in following explanation, calculation of the feature vector y(xi) from the feature vector xi is represented as operation of a function y to the feature vector xi.

Figure 6:
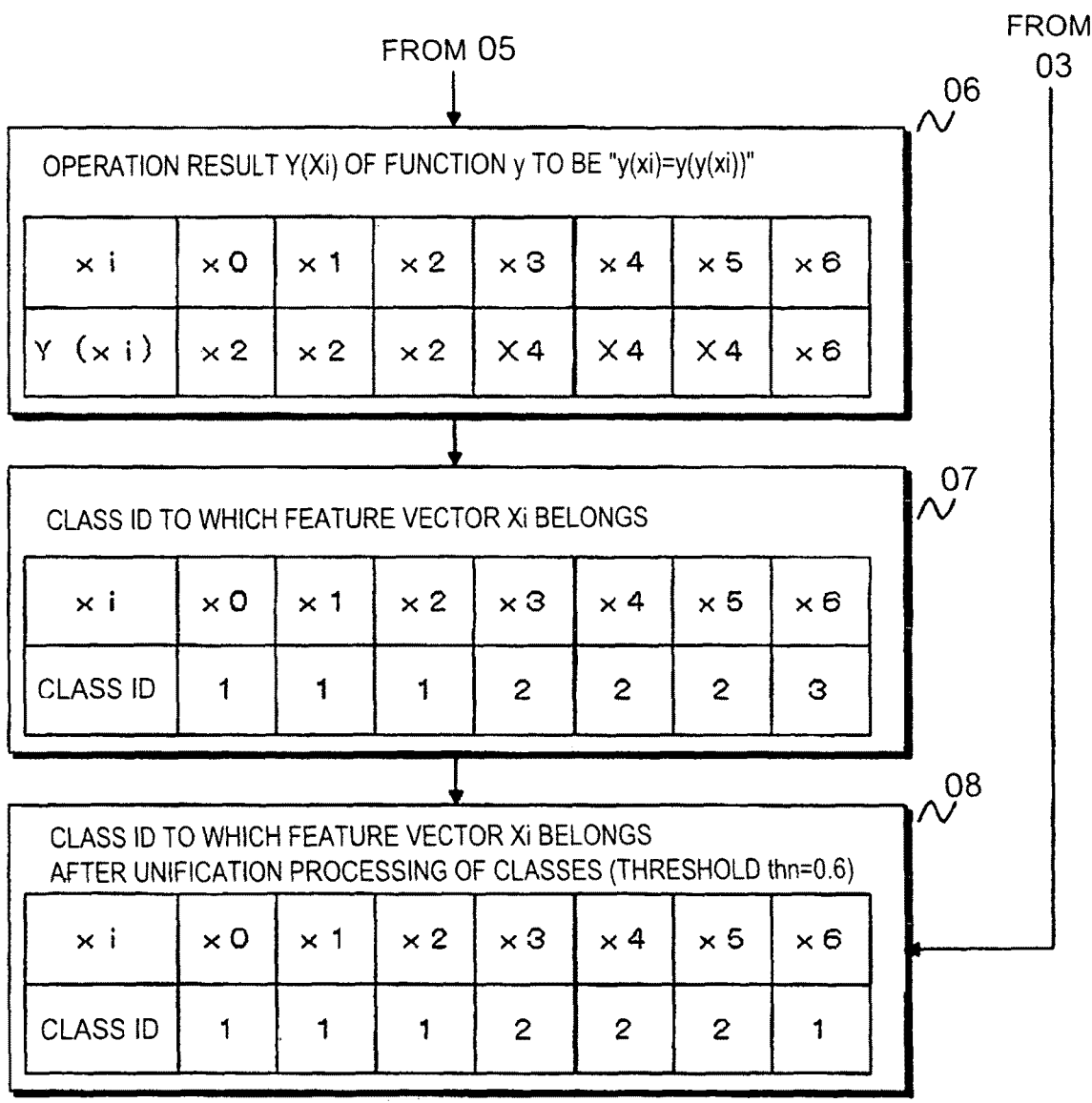
FIG. 6 is a third operation example of the clustering processing.

Next, the classification unit 13 assigns a class ID to each feature vector by referring to the table (created by the determination unit 12) (S108 in FIG. 3, operation examples O6 and O7 in FIG. 6). The classification unit 13 outputs the class ID of each feature vector to the control unit 14.

As to each feature vector xi, the classification unit 13 decides whether a feature vector y(xi) classified into the same class as the feature vector xi is same as the feature vector xi. If the feature vector y(xi) is same as the feature vector xi, processing is completed. If the feature vector y(xi) is not same as the feature vector xi, the function y is operated again as "xi=y(xi)". This operation processing of the function y is repeated until operation result does not change (operation example O6 in FIG. 6). Then, feature vectors of which operation results (continually operated by the function y) are same are classified into the same class (operation example O7 in FIG. 6).

After assigning the class ID by referring to the table, the classification unit 13 may execute processing to unify a plurality of classes having similar feature vectors to one class using the first neighbor feature and the second neighbor feature. For example, by setting a threshold thn, in a cluster RFi of first neighbor feature and a cluster RSi of second neighbor feature of the feature vector xi, assume that a feature vector xn having a similarity (with the feature vector xi) larger than the threshold thn and having a class ID different from a class ID of the feature vector xi exists (In operation example O3 of FIG. 5, the second neighbor feature x6 of x0). In this case, a class to which the feature vector xi belongs and a class to which the feature vector xn are clustered as one class (operation example O8 in FIG. 6). For example, if maximum of the similarity is 1, the threshold thn is set to 0.6.

The control unit 14 checks whether change of threshold ths or change of threshold thc is necessary (S109 in FIG. 3). If change of threshold ths or change of threshold thc is necessary (Yes at S109 in FIG. 3), the control unit 14 checks whether change of threshold ths is necessary (S110 in FIG. 3). If change of threshold ths is necessary (Yes at S110 in FIG. 3), the control unit 14 outputs thresholds ths and thc to the determination unit 12, and processing is returned to S105. If change of threshold ths is not necessary (No at S110 in FIG. 3), the control unit 14 outputs threshold thc to the determination unit 12, and processing is returned to S106. If neither change of threshold ths nor change of threshold thc is necessary (No at S109 in FIG. 3), processing is completed. After receiving changed thresholds ths and thc from the control unit 14, the determination unit 14 creates a table again based on thresholds ths and thc.

The control unit 14 may change thresholds ths and thc based on assignment result of class ID (acquired from the classification unit 13). For example, these thresholds may be changed by calculating the number of classes. If a ratio of the number of classes (classified) to the number of feature vectors (N) is above a predetermined value, in order to reduce the number of classes, values of thresholds ths and thc may be heightened. If the ratio is below the predetermined value, in order to increase the number of classes, values of thresholds ths and thc may be lowered. Furthermore, values of thresholds ths and thc may be changed based on not the ratio but a predetermined number of classes.

Furthermore, the control unit 14 may change thresholds ths and thc based on an input value from a user via the operation unit 102. These thresholds ths and thc can be changed not one time but many times. Furthermore, a threshold thn may be added to the threshold to be changed. Moreover, if only threshold thn is changed, processing is returned to S108.

As mentioned-above, in the first embodiment, similarity information between two feature vectors of all combination is not necessary. By preparing a memory to store information as order of the number (N) of feature vectors (=N×X(k+u)<N× N), signals as targets for identification can be clustered.

Furthermore, when threshold ths to compare similarity between feature vectors is changed, in order to estimate a density of each feature vector, similarity with feature vectors (the number thereof is predetermined) as selected samples is only referred. Accordingly, clustering can be quickly performed. Furthermore, interactive processing to change threshold ths can be realized.

Table 1 shows two measurement results of clustering processing time for 10000 face images of which dimensional number of feature vectors is 5120, by a conventional experiment 1 (similarity between samples of all combinations is stored in a memory) and an experiment 1 (the first embodiment). In comparison with the conventional experiment 1, as to the experiment 1, the memory usage can be reduced and the processing time (after changing threshold ths) can be shortened.

TABLE 1

TARGET FOR IDENTIFICATION: 10000 FACE IMAGES
EXPERIMENTAL ENVIRONMENT: Core 2 Duo 3.2 GHz

|  | CONVENTIONAL EXPERIMENT | EXPERIMENT |
|---|---|---|
| PROCESSING TIME (THRESHOLD = 0.60) | 306 sec | 306 sec |
| MEMORY USAGE | 383 MB | 1 MB |
| PROCESSING TIME AFTER CHANGING THRESHOLD (THRESHOLD = 0.59) | 2 sec | 14 msec |

When the threshold thc is a smaller value, the feature value $x_i$ is apt to be updated as different feature vector ($y(x_i) \neq x_i$). In this case, cluster of feature vectors is too large, and accuracy of clustering may lower. However, in the first embodiment, as for each feature vector, by referring to similarity with feature vectors (the number thereof is predetermined), cluster of feature vectors is not so large, and accuracy of clustering does not lower. Furthermore, by using not only the first neighbor feature but also the second neighbor feature (representing whether neighbor feature vectors belong to different group of features), many feature vectors can be effectively clustered. As a result, when a value of threshold thc is high, accuracy of clustering improves.

Figure 11:
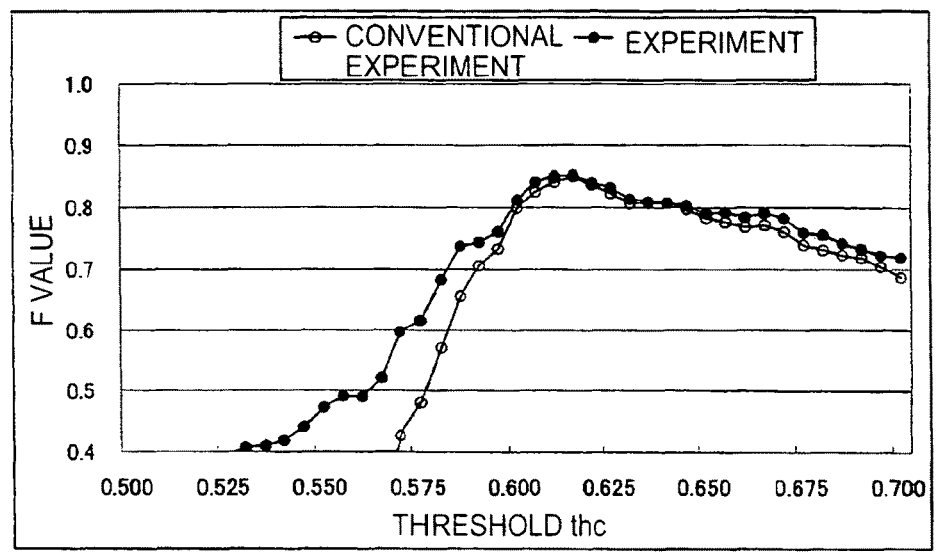
FIG. 11 is a graph showing accuracy of clustering processing of conventional experiment 1 and the first embodiment.

In the same way as method of conventional experiment 1, as shown in FIG. 11, clustering accuracy for 828 face images (73 persons) of which number of dimension of feature vector is 5120 is measured (threshold thc=threshold ths, threshold thn=∞). The accuracy is represented as F value (=2*recall*precision/(recall+precision)) of harmonic mean using recall and precision. The precision is scale to represent whether each class comprises one person data. Concretely, assume that the number of feature vectors of the same person in some class is C and the number of all feature vectors of the same person is R. In this case, average of C/R of each class is the precision. Moreover, if a plurality of persons to calculate the number of feature vectors belongs to the same class, a person having the maximum number of feature vectors is selected. Furthermore, the recall is scale to represent whether each person is classified into one class. Concretely, assume that the number of all feature vectors of each person is R, a class to which most persons belong is selected and the number of feature vectors of the same person in the class is C. In this case, average of C/R of each person is the recall. Moreover, the same class cannot be selected plural times. In FIG. 11, effect of the first embodiment is confirmed when threshold thc is low value or high value.

Figure 12:
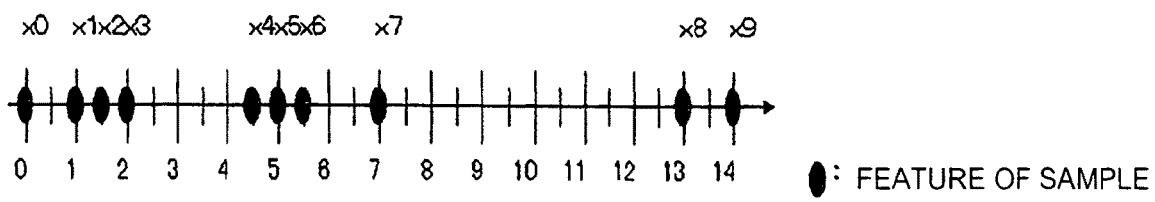
FIG. 12 is a schematic diagram showing samples of a first-dimensional feature vector.

Furthermore, first-dimensional feature vectors x0~x9 are typically shown in FIG. 12. As operation example of targets x0~x9 for identification, a measurement result (Table 2) by conventional experiment 1, a measurement result (table 3) by experiment 2, and a measurement result (Table 4) by experiment 3, are shown. In this case, Euclid distance is D, similarity is represented as 1/(1+D), weight of second neighbor feature is 1, and thresholds the and the are 0.27. In the experiment 3, the second neighbor feature is used. Accordingly, irrespective of the same memory, neighbor feature vectors at more distance from each feature vector can be referred, and x0~x7 are regarded as one class.

TABLE 2

CONVENTIONAL EXPERIMENT 1

|  | x0 | x1 | x2 | x3 | x4 | x5 | x6 | x7 | x8 | x9 | | DEN-SITY | y(xi) | CLASS ID | |
|---|---|---|---|---|---|---|---|---|---|---|---|---|---|---|---|
| s(0, j) |  | 0.50 | 0.40 | 0.33 | 0.18 | 0.17 | 0.15 | 0.13 | 0.07 | 0.07 | x0 | 3.02 | x1 | 1 | |
| s(1, j) | 0.50 |  | 0.67 | 0.50 | 0.22 | 0.20 | 0.18 | 0.14 | 0.08 | 0.07 | x1 | 3.62 | x2 | 1 | |
| s(2, j) | 0.40 | 0.87 |  | 0.67 | 0.25 | 0.22 | 0.20 | 0.15 | 0.08 | 0.07 | x2 | 3.77 | x2 | 1 | X2 AND X5 ARE |
| s(3, j) | 0.33 | 0.50 | 0.67 |  | 0.21 | 0.25 | 0.22 | 0.17 | 0.08 | 0.08 | x3 | 3.61 | x2 | 1 | NOT CLUSTERED |
| s(4, j) | 0.18 | 0.22 | 0.25 | 0.29 |  | 0.17 | 0.50 | 0.28 | 0.11 | 0.10 | x4 | 3.60 | x5 | 2 | BECAUSE |
| s(5, j) | 0.17 | 0.20 | 0.22 | 0.25 | 0.67 |  | 0.67 | 0.33 | 0.11 | 0.10 | x5 | 3.75 | x5 | 2 | SIMILARITY |
| s(6, j) | 0.15 | 0.18 | 0.20 | 0.22 | 0.50 | 0.17 |  | 0.40 | 0.12 | 0.11 | x6 | 3.57 | x5 | 2 | THEREOF IS LOW |
| s(7, j) | 0.13 | 0.14 | 0.15 | 0.17 | 0.29 | 0.33 | 0.40 |  | 0.14 | 0.13 | x7 | 2.84 | x6 | 2 | |
| s(8, j) | 0.07 | 0.03 | 0.01 | 0.08 | 0.11 | 0.11 | 0.12 | 0.14 |  | 0.50 | x8 | 2.37 | x8 | 3 | |
| s(9, j) | 0.07 | 0.07 | 0.07 | 0.08 | 0.10 | 0.10 | 0.11 | 0.13 | 0.50 |  | x9 | 2.32 | x8 | 3 | |

TABLE 3

EXPERIMENT 2 (WITHOUT THE SECOND NEIGHBOR FEATURE, k = 1, u = 2)
INFORMATION OF BLANK COLUMN IS NOT STORED INTO THE MEMORY

|  | x0 | x1 | x2 | x3 | x4 | x5 | x6 | x7 | x8 | x9 | | DEN-SITY | y(xi) | CLASS ID | |
|---|---|---|---|---|---|---|---|---|---|---|---|---|---|---|---|
| s(0, j) |  | 0.50 | 0.40 | 0.33 |  |  |  |  |  |  | x0 | 1.57 | x1 | 1 | |
| s(1, j) | 0.50 |  | 0.67 | 0.50 |  |  |  |  |  |  | x1 | 2.06 | x2 | 1 | X2 AND X5 ARE |
| s(2, j) | 0.43 | 0.67 |  | 0.67 |  |  |  |  |  |  | x2 | 2.13 | x2 | 1 | NOT CLUSTERED |
| s(3, j) | 0.33 | 0.50 | 0.67 |  |  |  |  |  |  |  | x3 | 1.87 | x2 | 1 | BECAUSE |
| s(4, j) |  |  |  |  |  | 0.67 | 0.50 | 0.29 |  |  | x4 | 1.62 | x5 | 2 | SIMILARITY |
| s(5, j) |  |  |  |  | 0.67 |  | 0.67 | 0.33 |  |  | x5 | 2.06 | x5 | 2 | THEREOF |
| s(6, j) |  |  |  |  | 0.50 | 0.67 |  | 0.40 |  |  | x6 | 1.95 | x5 | 2 | IS NOT STORED |
| s(7, j) |  |  |  |  | 0.29 | 0.33 | 0.40 |  |  |  | x7 | 1.33 | x6 | 2 | |
| s(8, j) |  |  |  |  |  | 0.12 | 0.14 |  |  | 0.50 | x8 | 1.11 | x8 | 3 | |
| s(9, j) |  |  |  |  |  | 0.11 | 0.13 | 0.50 |  |  | x9 | 1.08 | x8 | 3 | |

TABLE 4

EXPERIMENT 3 (WITH THE SECOND NEIGHBOR FEATURE, k =1, u = 2)
INFORMATION OF BLANK COLUMN IS NOT STORED INTO THE MEMORY

| | GROUP OF FEATURES 1 | | | | GROUP OF FEATURES 2 | | | GROUP OF FEATURES 3 | | | DEN-SITY | | CLASS ID | |
|---|---|---|---|---|---|---|---|---|---|---|---|---|---|---|
| | x0 | x1 | x2 | x3 | x4 | x5 | x6 | x7 | x8 | x9 | | y(xi) | | |
| s(0,j) | 0.50 | | | | 0.11 | | | 0.13 | | | x0 1.15 | x1 | 1 | |
| s(1,j) | | 0.67 | | | 0.22 | | | 0.14 | | | x1 1.39 | x2 | 1 | |
| s(2,j) | 0.67 | | | | 0.25 | | | 0.15 | | | x2 1.42 | x3 | 1 | X3 AND X4 ARE |
| s(3,j) | | 0.67 | | | 0.29 | | | 0.17 | | | x3 1.47 | x4 | 1 | CLUSTERED, |
| s(4,j) | | | 0.29 | | | 0.67 | | 0.29 | | | x4 1.50 | x5 | 1 | AND X0~X7 ARE |
| s(5,j) | | | 0.25 | | | | 0.67 | 0.33 | | | x5 1.50 | x6 | 1 | UNIFIED AS ONE |
| s(6,j) | | | 0.22 | | | 0.67 | | 0.40 | | | x6 1.64 | x6 | 1 | CLASS |
| s(7,j) | | | | 0.17 | 0.33 | 0.40 | | | | | x7 1.21 | x6 | 1 | |
| s(8,j) | | | | | | | 0.12 | 0.14 | | 0.50 | x8 1.11 | x8 | 2 | |
| s(9,j) | | | | | | | 0.11 | 0.13 | 0.50 | | x9 1.09 | x8 | 2 | |

The Second Embodiment

Next, the signal classification apparatus 100*b* of the second embodiment is explained. As to the same unit in the first embodiment, the same sign is assigned, and its explanation is omitted.

Figure 13:
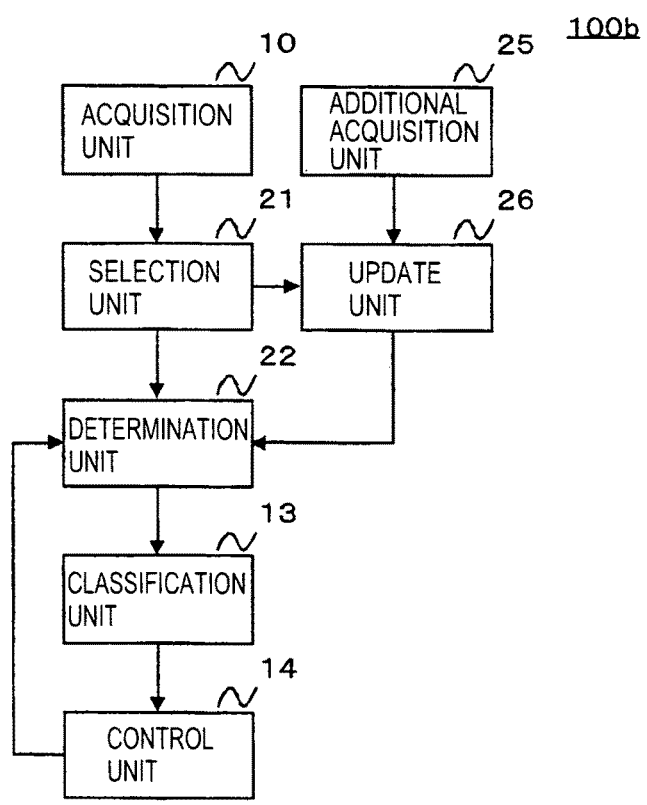
FIG. 13 is a block diagram of the signal classification apparatus according to the second embodiment.

As shown in FIG. 13, the signal classification apparatus 100*b* includes the acquisition unit 10, a selection unit 21, a determination unit 22, an additional acquisition unit 25, an update unit 26, the classification unit 13, and the control unit 14. In FIG. 13, the selection unit 21, the determination unit 22, the additional acquisition unit 25 and the update unit 26 are function units realized in cooperation with the CPU 101 and a predetermined program stored in the ROM 104, in the same way as the acquisition unit 10, the classification unit 13 and the control unit 14.

The selection unit 21 includes a first selection unit and a second selection unit. As to each feature vector (the number thereof is N) acquired by the acquisition unit 11, the first selection unit selects first neighbor features (the number thereof is k ($1 \leq k \leq N$) similar to the feature vector from feature vectors acquired. The second selection unit generates a plurality of groups each including similar feature vectors, and selects second neighbor features (the number thereof is u) each belonging to different groups. The selection unit 21 outputs the first neighbor feature and the second neighbor feature (acquired for each feature vector) to the determination unit 22 and the update unit 26.

The additional acquisition unit 25 acquires feature vectors representing targets for identification additionally input via the input unit 106. In the same way as method of the acquisition unit 10, the additional acquisition unit 25 acquires the feature vectors, and outputs the feature vectors as additional feature vectors to the update unit 26.

Assume that the number of feature vectors (acquired by the acquisition unit 10) is N and the number of additional feature vectors (acquired by the acquisition unit 25) is M. As for each feature vector, by referring to the additional feature vectors, the update unit 26 updates the first neighbor features (the number thereof is k) and the second neighbor features (the number thereof is u) selected by the selection unit 21. From the feature vectors and the additional feature vectors (the number thereof is N+M), the update unit 26 selects first neighbor features (the number thereof is k) and second neighbor features (the number thereof is u) of each additional feature vector. The update unit 26 outputs first neighbor features and second neighbor features (updated for each feature vector) to the determination unit 22. Furthermore, the update unit 26 outputs the first neighbor features and second neighbor features (selected for each additional feature vector) to the determination unit 22.

By using the first neighbor features and the second neighbor features (updated for each feature vector), and the first neighbor features and second neighbor features (selected for each additional feature vector), the determination unit 22 estimates a density of each feature vector, and a density of each additional feature vector. A method for estimating the density by the determination unit 22 is same as the method by the determination unit 12 in the first embodiment.

Furthermore, the determination unit 22 creates a table to refer to feature vectors (or additional feature vectors) belonging to the same class as each feature vector (and each additional feature vector), and outputs the table to the classification unit 13.

Figure 14:
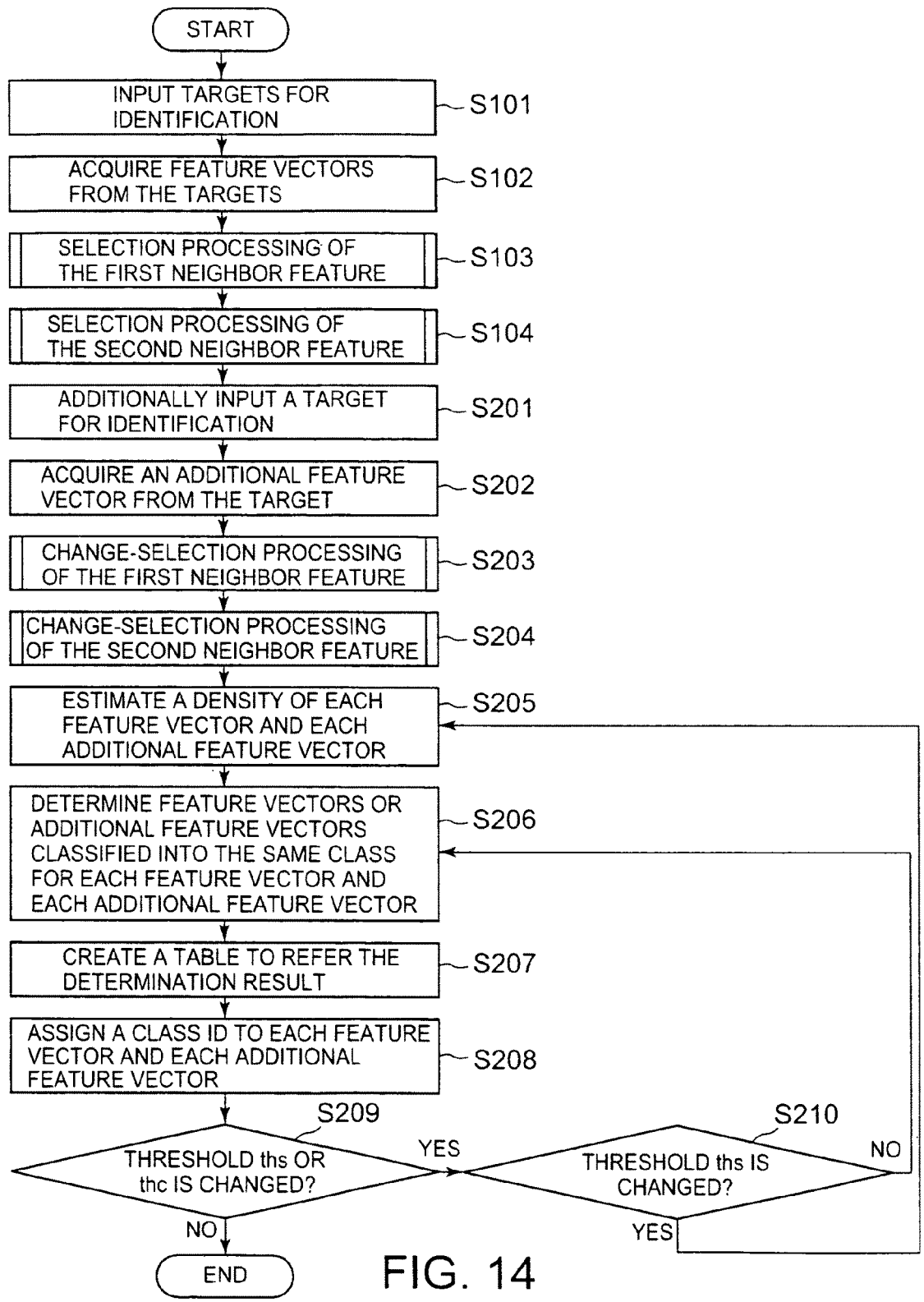
FIG. 14 is a flow chart of clustering processing according to the second embodiment.

Next, operation of the signal classification apparatus 100*b* of the second embodiment is explained by referring to FIG. 14. First, when a signal (as a target for identification) is input via the input unit 106 (S101 in FIG. 14), the acquisition unit 10 acquires feature vectors from the target (S102 in FIG. 14). The acquisition unit 10 outputs the feature vectors to the selection unit 21.

Next, the selection unit 21 executes selection processing of first neighbor feature (to select first neighbor features of each feature vector) (S103 in FIG. 14). Furthermore, the selection unit 21 executes selection processing of second neighbor feature (to select second neighbor features of each additional feature vector) (S104 in FIG. 14). The selection unit 21 outputs the first neighbor features and the second neighbor features to the determination unit 22 and the update unit 26.

Next, when a signal (as a target for identification) is additionally input via the input unit 106 (S201 in FIG. 14), the additional acquisition unit 25 acquires feature vectors from the target additionally input (S202 in FIG. 14). The additional acquisition unit 25 outputs the additional feature vectors to the update unit 26.

Next, the update unit 26 executes change-selection processing of first neighbor feature (to change the first neighbor feature of each feature vector and select a first neighbor feature of each additional feature vector) (S203 in FIG. 14). Detail operation of the change-selection processing of first neighbor feature is explained by referring to FIG. 15. In this case, the feature vectors acquired by the acquisition unit 10 are represented as xi (i=0, 1, . . . , N−1), and the additional feature vectors acquired by the additional acquisition unit 25 are represented as xi (i=N, N+1 . . . , N+M−1).

Figure 15:
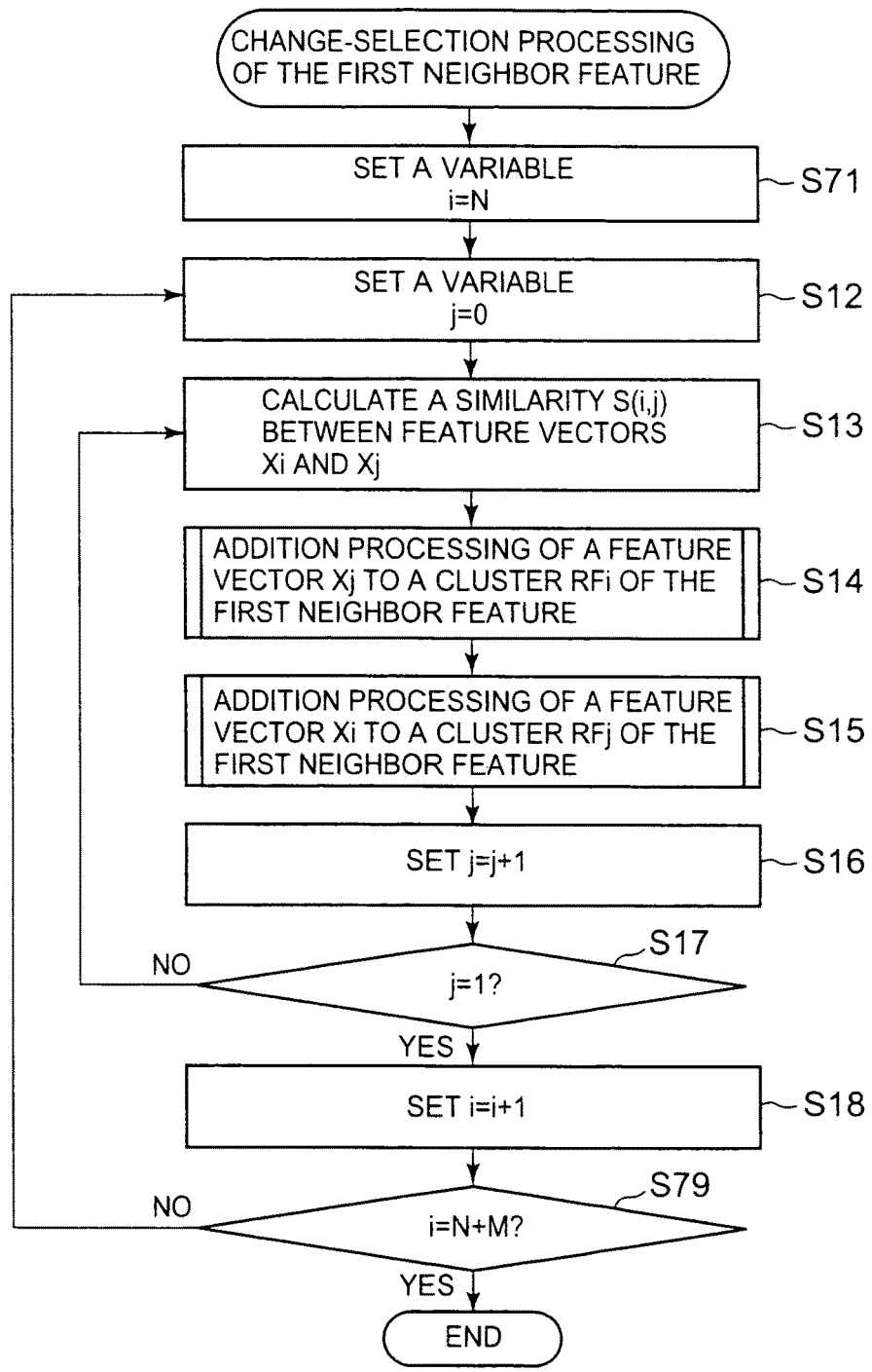
FIG. 15 is a flow chart of selection processing of the first neighbor feature in FIG. 14.

First, the update unit 26 sets a variable 1=N as a reference number of feature vector to refer a first additional feature vector (S71 in FIG. 15). Hereinafter, processing of S12~S18 is same as processing of S12~S18 in FIG. 7 of the first embodiment. Accordingly, their explanation is omitted.

Next, the update unit 26 decides whether processing S12~S18 is executed for all additional feature vectors acquired (S79 in FIG. 15). If the processing S12~S18 is completed for all additional feature vectors (Yes at S79), processing is completed. If the processing S12~S18 is not completed for all additional feature vectors (No at S79), processing is returned to S12.

Next, the update unit 26 executes change-selection processing of second neighbor feature (to change the second neighbor feature of each feature vector and select a second neighbor feature of each additional feature vector) (S204 in FIG. 14). Detail operation of the change-selection processing of second neighbor feature is explained by referring to FIG. 16.

Figure 16:
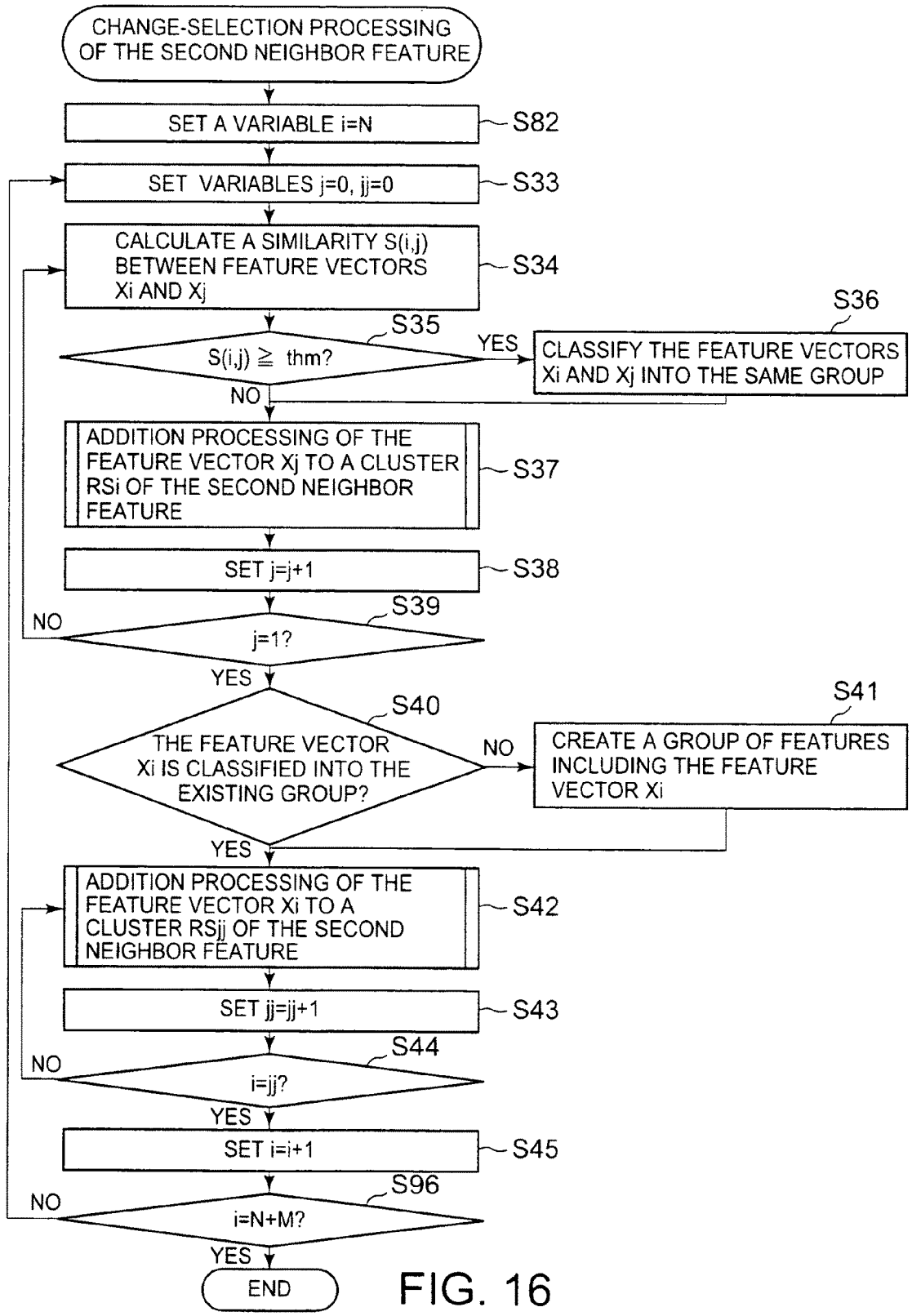
FIG. 16 is a flow chart of selection processing of the second neighbor feature in FIG. 14.

First, the update unit 26 sets a variable i=N as a reference number of feature vector to refer a first additional feature vector (S82 in FIG. 16). Hereinafter, processing of S33~S45 is same as processing of S33~S45 in FIG. 9 of the first embodiment. Accordingly, their explanation is omitted.

Next, the update unit 26 decides whether processing S33~S45 is executed for all additional feature vectors acquired (S96). If the processing S33~S45 is completed for all additional feature vectors (Yes at S96), processing is completed. If the processing S33~S96 is not completed for all additional feature vectors (No at S96), processing is returned to S33. Moreover, the update unit 26 can execute the change-selection processing of first neighbor feature and the change-selection processing of second neighbor feature in parallel, in the same way as the method of the selection unit 11.

The update unit 26 can change the number (k) of first neighbor features and the number (u) of second neighbor features, based on the number of feature vectors and the number of additional feature vectors. For example, if (k+u) is approximated as 1% of N, k and u may be respectively increased so that (k+u) are approximated as 1% of (N+M). The update unit 26 outputs the first neighbor feature and the second neighbor feature to the determination unit 22.

Next, the determination unit 22 estimates a density of each feature vector and a density of each additional feature vector (S205 in FIG. 14), and determines feature vectors (or additional feature vectors) classified into the same class as each feature vector (and additional feature vector) from the first neighbor features and the second neighbor features (S206 in FIG. 14). The determination unit 22 creates a table to refer the determination result (S207 in FIG. 14), and outputs the table to the classification unit 13.

Next, by referring to the table (created by the determination unit 22), the classification unit 13 assigns a class ID to each feature vector and a class ID to each additional feature vector (S208). The classification unit 13 outputs the class ID of each feature vector and the class ID of each additional feature vector to the control unit 14.

Next, the control unit 14 checks whether change of threshold ths or change of threshold thc is necessary (S209 in FIG. 14). If change of threshold ths or change of threshold thc is necessary (Yes at S209 in FIG. 14), the control unit 14 checks whether change of threshold ths is necessary (S210 in FIG. 14). If change of threshold ths is necessary (Yes at S210 in FIG. 14) the control unit 14 outputs thresholds ths and thc to the determination unit 22, and processing is returned to S205. If change of threshold ths is not necessary (No at S210 in FIG. 14), the control unit 14 outputs threshold thc to the determination unit 22, and processing is returned to S206. If neither change of threshold ths nor change of threshold thc is necessary (No at S209 in FIG. 14), processing is completed.

Moreover, by using the first neighbor feature and the second neighbor feature (input from the selection unit 21), the determination unit 22, the classification unit 13 and the control unit 14 may execute processing of S105~S110 in FIG. 3, and assign a class ID to each feature vector (acquired by the acquisition unit 10).

As mentioned-above, in the second embodiment, when a new target for identification is added, by using clustering result acquired before addition, clustering processing (including the new target) can be executed effectively and quickly.

The Third Embodiment

Next, the signal classification apparatus 100*c* of the third embodiment is explained. As to the same unit in the first embodiment, the same sign is assigned, and its explanation is omitted.

Figure 17:
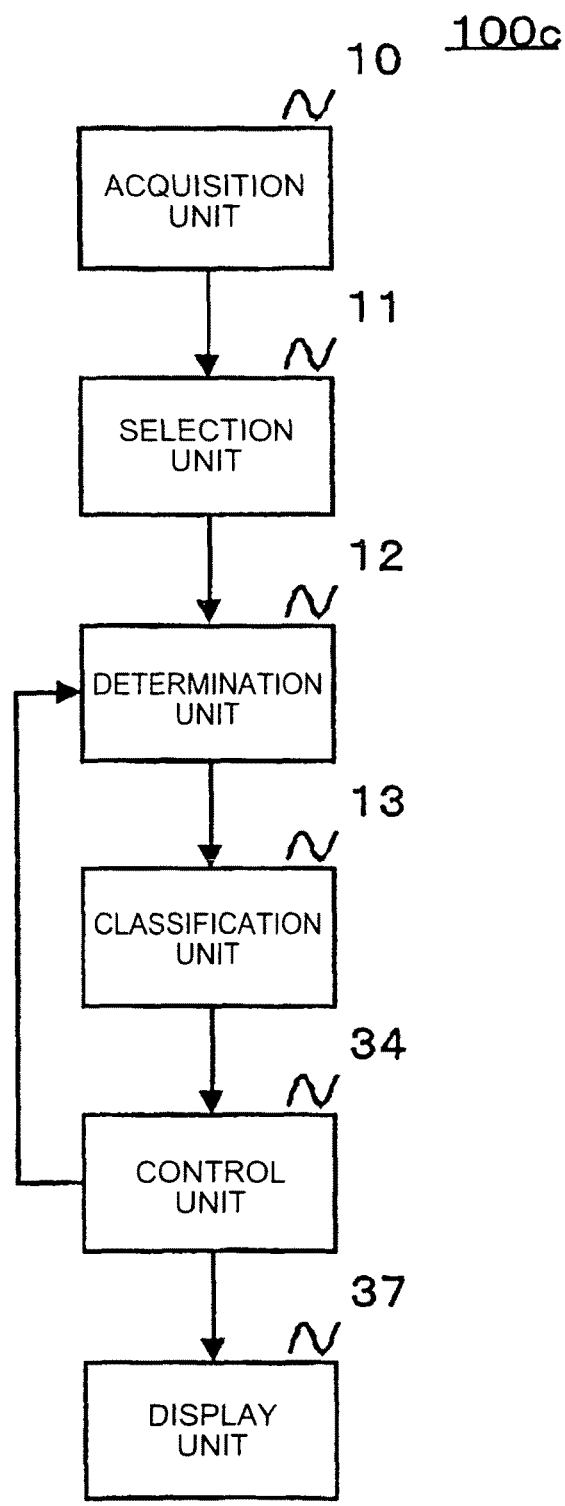
FIG. 17 is a block diagram of the signal classification apparatus according to the third embodiment.

As shown in FIG. 17, the signal classification apparatus 100*c* includes the acquisition unit 10, the selection unit 11, the determination unit 12, the classification unit 13, a control unit 34 and a display unit 37. In FIG. 17, the control unit 34 and the display unit 37 are function units realized in cooperation with the CPU 101 and a predetermined program stored in the ROM 104, in the same way as the acquisition unit 10, the selection unit 11, the determination unit 12 and the classification unit 13.

The control unit 34 outputs an assignment result of class ID (acquired from the classification unit 13). Based on the assignment result of class ID (acquired from the control unit 34), the display unit 37 displays a classification result of targets using images or characters.

Figure 18:
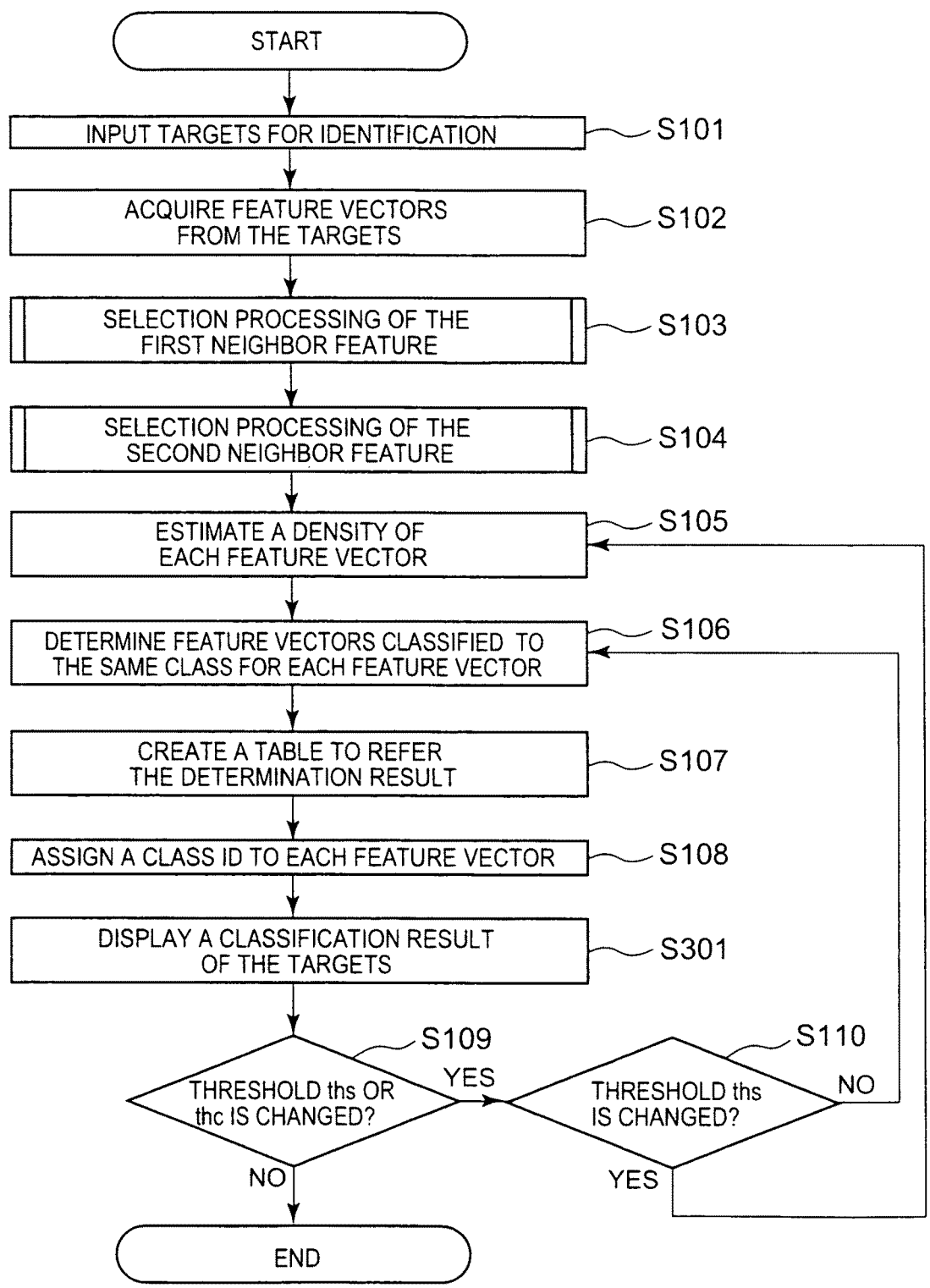
FIG. 18 is a flow chart of clustering processing according to the third embodiment.

Next, operation of the signal classification apparatus 100*c* of the third embodiment is explained by referring to FIG. 18. First, when a signal (as a target for identification) is input via the input unit 106 (S101 in FIG. 18), the acquisition unit 10 acquires feature vectors from the target (S102 in FIG. 18). The acquisition unit 10 outputs the feature vectors to the selection unit 11.

Next, the selection unit 11 executes selection processing of first neighbor feature (to select first neighbor features of each feature vector) (S103 in FIG. 18). Furthermore, the selection unit 11 executes selection processing of second neighbor feature (to select second neighbor features of each feature vector) (S104 in FIG. 18). The selection unit 11 outputs the first neighbor features and the second neighbor features to the determination unit 12.

Next, the determination unit 12 estimates a density of each feature vector (S105 in FIG. 18), and determines feature vectors classified into the same class as each feature vector from the first neighbor features and the second neighbor features (S106 in FIG. 18). The determination unit 12 creates a table to refer the determination result (S107 in FIG. 18), and outputs the table to the classification unit 13.

Next, by referring to the table (created by the determination unit 12), the classification unit 13 assigns a class ID to each feature vector (S108 in FIG. 18). The classification unit 13 outputs the class ID of each feature vector to the control unit 34. Next, the control unit 34 outputs the class ID of each feature vector to the display unit 37. Next, the display unit 37 displays a classification result of targets for identification (S301 in FIG. 18).

Figure 19:
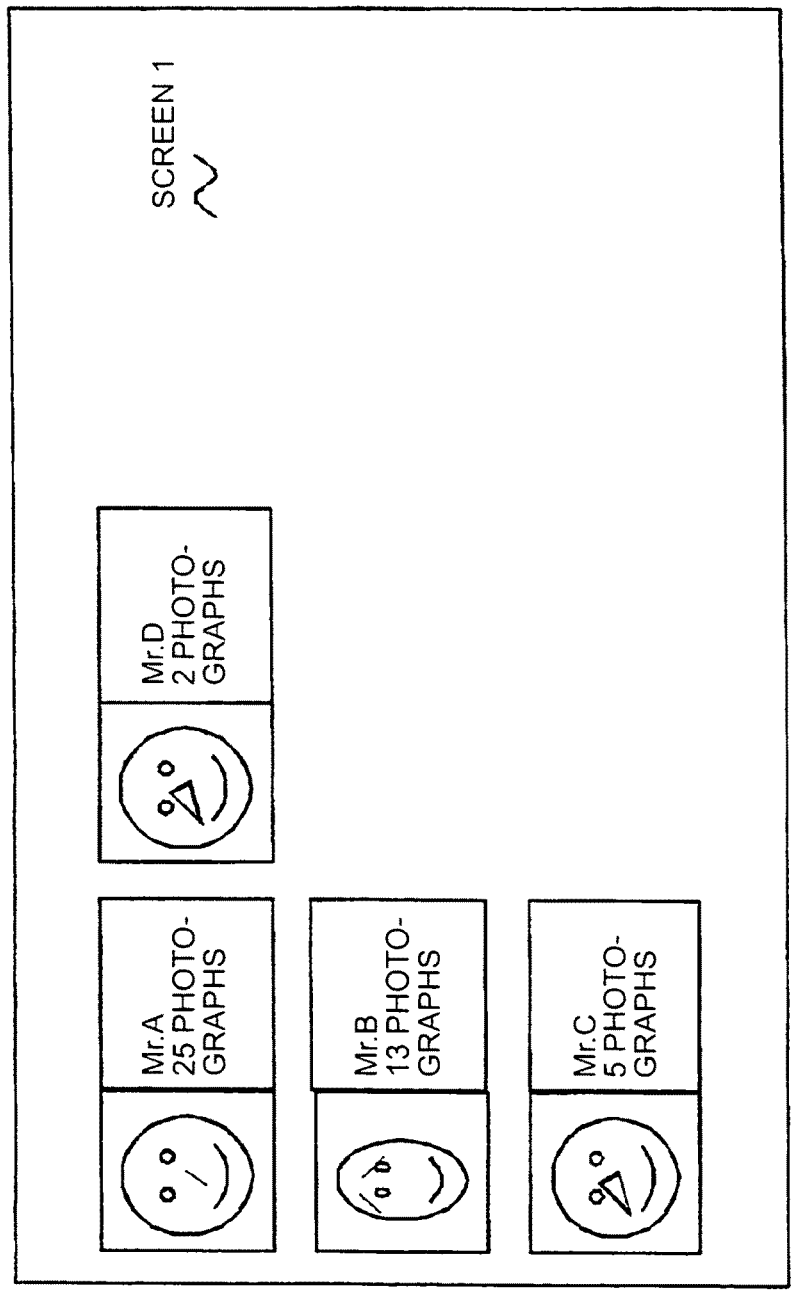
FIG. 19 is a first display example of clustering processing result of images according to the third embodiment.
Figure 20:
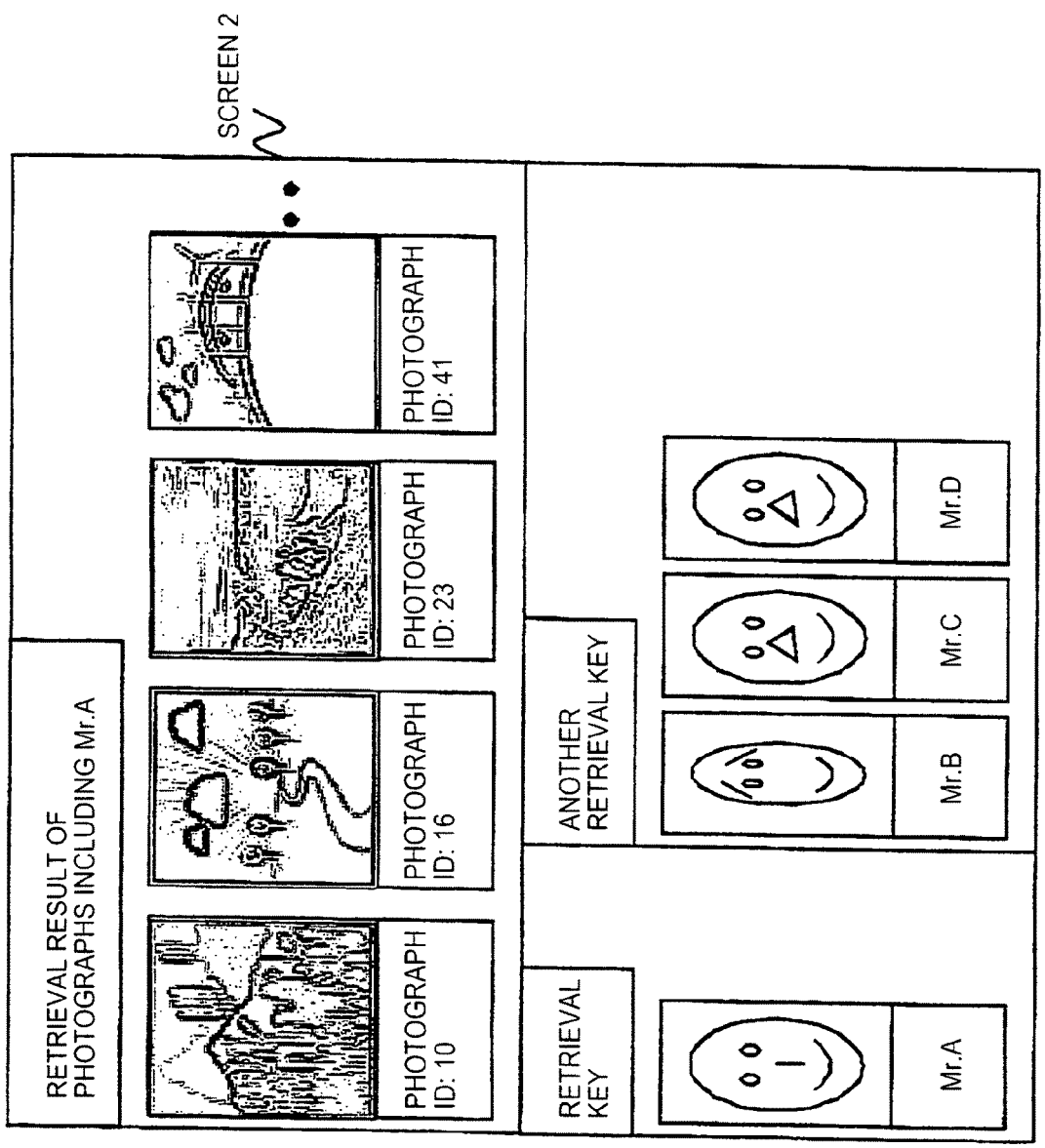
FIG. 20 is a second display example of clustering processing result of images according to the third embodiment.

If a target for identification is an electric signal representing a face image, as shown in FIG. 19, the display unit 37 can display a list of face images classified into each person. Furthermore, as shown in FIG. 20, by selecting a specified face, the display unit 37 can display a list of face images of the specified face, and retrieval of specified person can be easily performed. In this way, in the display unit 37, face image are retrieved using not the target for identification only, but a plurality of variations (combination of the target for identification and the classification result by class ID of each feature vector).

Figure 21:
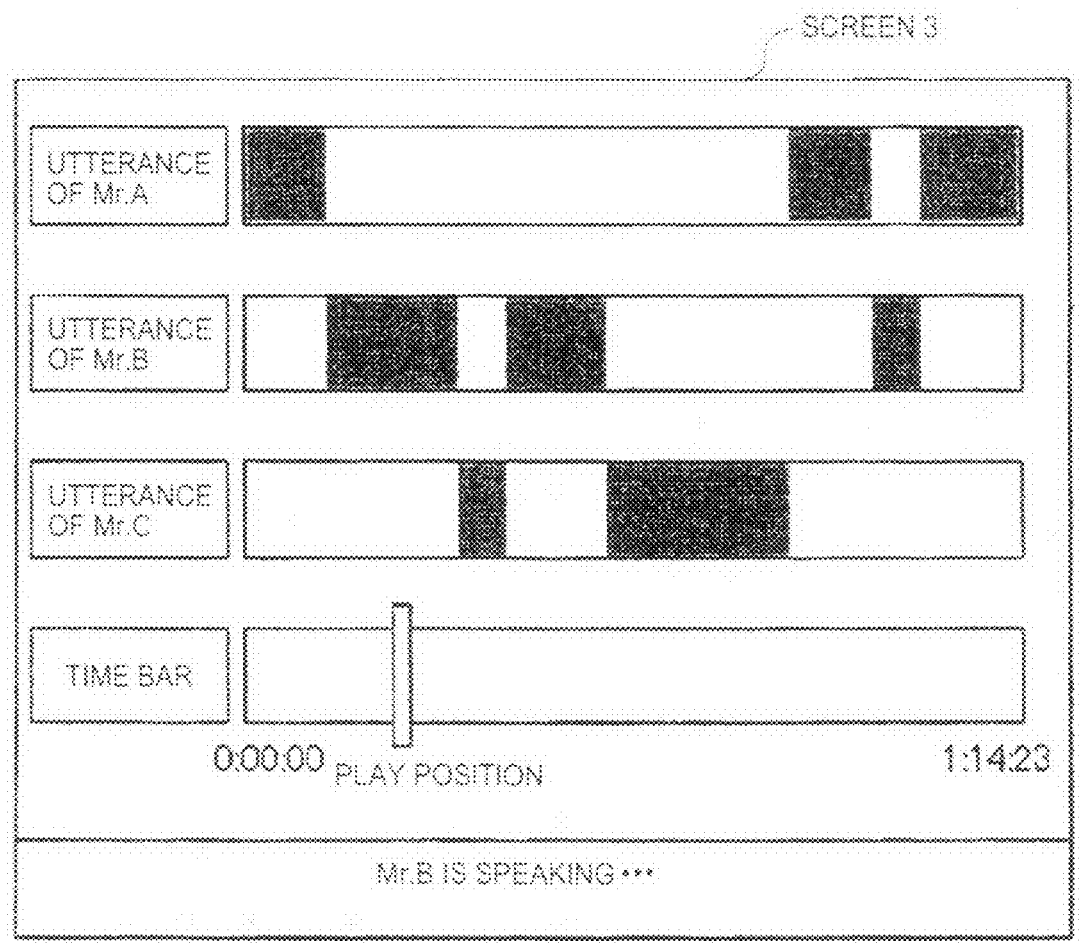
FIG. 21 is a display example of clustering processing result of utterances according to the third embodiment.
Figure 22:
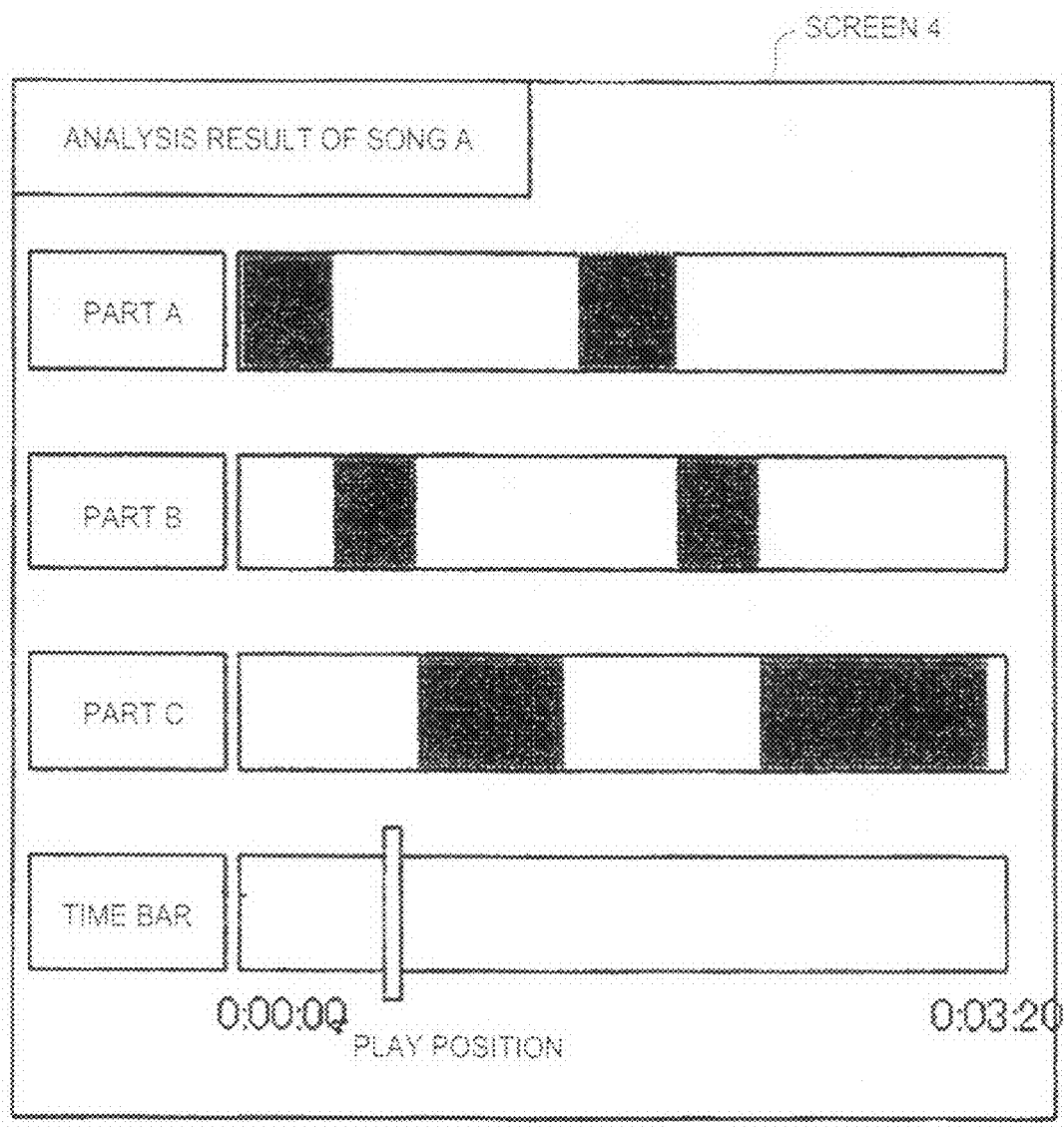
FIG. 22 is a first display example of clustering processing result of songs according to the third embodiment.

Furthermore, if the target for identification is a signal (such as speech) different from the image, the operation is explained. For example, if a signal as the target is speech at meeting, the speech is divided into a plurality of segments, and clustering processing (classification of the signal) is executed to each segment. The classification result is displayed as a time line of utterance of each speaker, and audition at a specified play position or audition of a specified utterance can be easily performed (FIG. 21). Furthermore, if the target for identification is a song signal, the song signal is divided into a plurality of segments, and clustering processing is executed to each segment. In this case, audition of a specified part (such as a specified melody or the most impressive part (chorus)) can be easily performed (FIG. 22). Furthermore, if a plurality of songs is targets for identification, the songs are classified into each similar song, and a list of similar songs can be displayed (FIG. 23).

Next, by retuning to FIG. 18, the control unit 34 of the third embodiment is explained. The control unit 34 checks whether change of threshold ths or change of threshold thc is necessary (S109 in FIG. 18). If change of threshold ths or change of threshold thc is necessary (Yes at S109 in FIG. 18), the control unit 14 checks whether change of threshold ths is necessary (S110 in FIG. 18). If change of threshold ths is necessary (Yes at S110 in FIG. 18), the control unit 34 outputs thresholds ths and thc to the determination unit 12, and processing is returned to S105. If change of threshold ths is not necessary (No at S110 in FIG. 18), the control unit 34 outputs threshold thc to the determination unit 12, and processing is returned to S106. If neither change of threshold ths nor change of threshold thc is necessary (No at S109 in FIG. 18), processing is completed.

As mentioned-above, in the third embodiment, after classifying the targets for identification into a plurality of classes, the classification result is displayed with various formats. Accordingly, audition, retrieval and data-sorting can be easily performed.

The Fourth Embodiment

Next, the signal classification apparatus 100d of the fourth embodiment is explained. As to the same unit in the first embodiment, the same sign is assigned, and its explanation is omitted.

Figure 24:
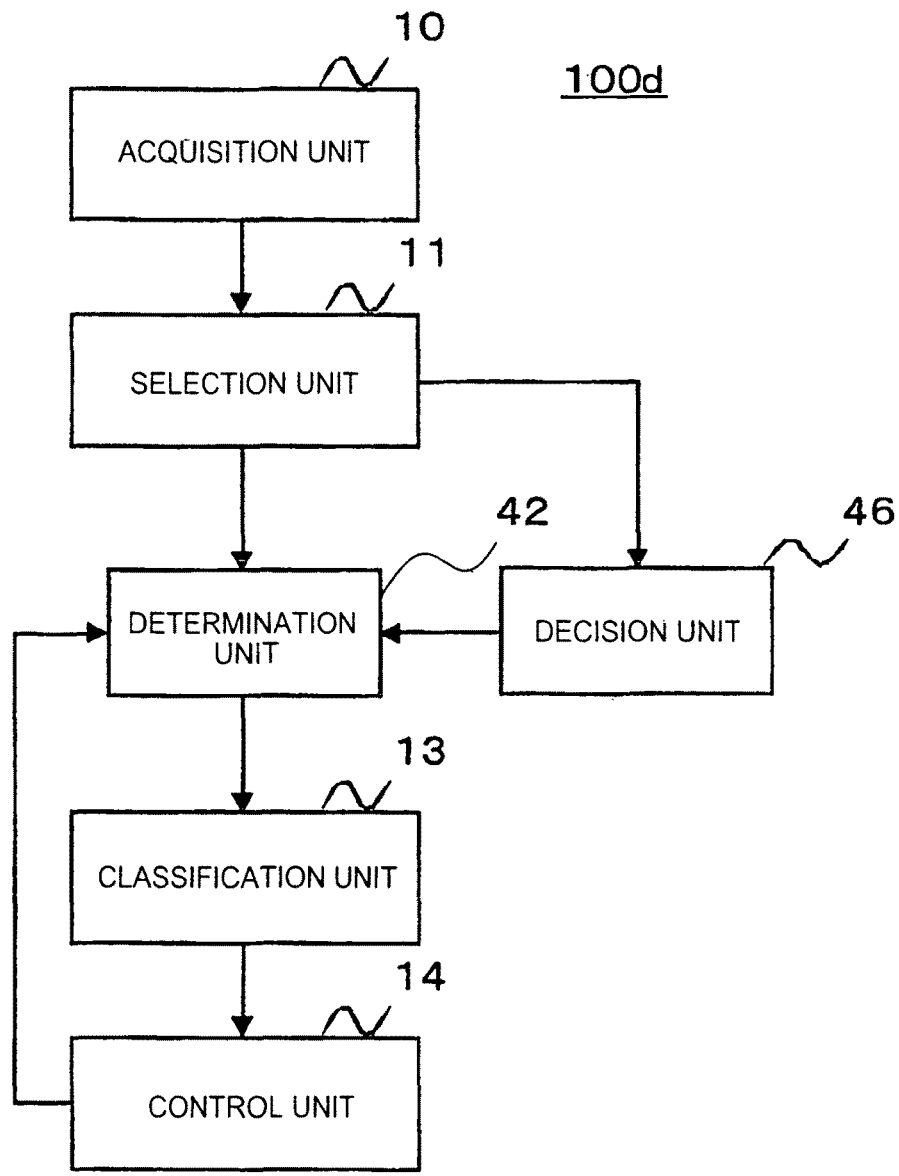
FIG. 24 is a block diagram of the signal classification apparatus according to the fourth embodiment.

As shown in FIG. 24, the signal classification apparatus 100d includes the acquisition unit 10, the selection unit 11, a determination unit 42, the classification unit 13, and the control unit 14. The determination unit 42 further includes a decision unit 46. In FIG. 24, the determination unit 42 is a function unit realized in cooperation with the CPU 101 and a predetermined program stored in the ROM 104, in the same way as the acquisition unit 10, the selection unit 11, the classification unit 13 and the control unit 14.

As to each feature vector (acquired by the acquisition unit 42), the decision unit 46 controls change of first neighbor features (the number thereof is k) and second neighbor features (the number thereof is u) selected by the selection unit 11. The decision unit 46 outputs the first neighbor features and the second neighbor features (updated for each feature vector) to the determination unit 22. Furthermore, the decision unit 46 outputs the first neighbor features and the second neighbor features (selected for each additional feature vector) to the determination unit 22.

By using the first neighbor feature and the second neighbor feature (output from the decision unit 46), the determination unit 42 estimates a density of each feature vector and a density of each additional feature vector. A method for estimating the density by the determination unit 42 is the same as the method by the determination unit 12 in the first embodiment.

Figure 25:
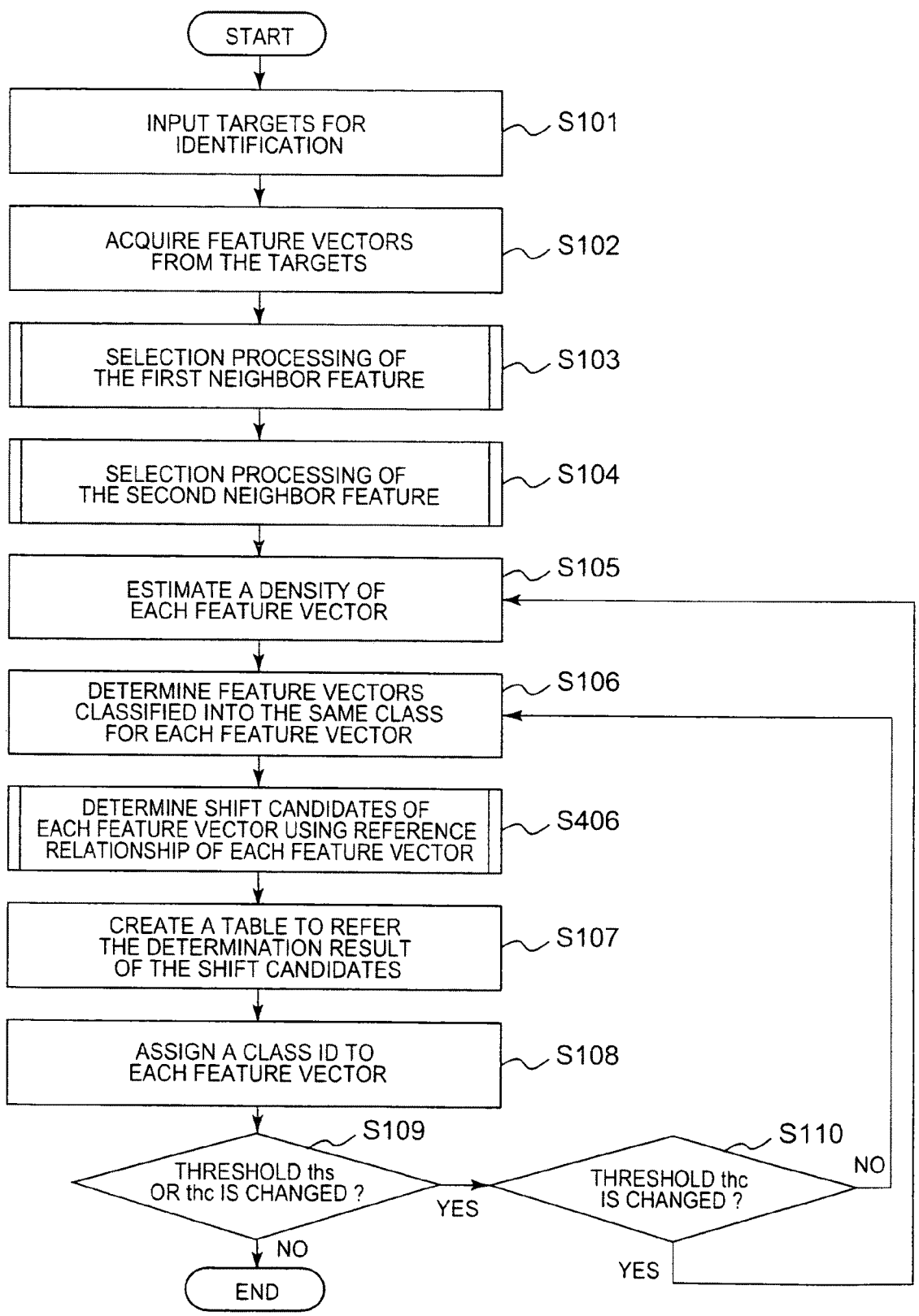
FIG. 25 is a flow chart of clustering processing according to the fourth embodiment.

Next, operation of the signal classification apparatus 100d of the fourth embodiment is explained by referring to FIG. 25. First, when a signal (as a target for identification) is input via the input unit 106 (S101 in FIG. 25), the acquisition unit 10 acquires feature vectors from the target (S102 in FIG. 25) The acquisition unit 10 outputs the feature vectors to the selection unit 11.

Next, the selection unit 11 executes selection processing of first neighbor feature (to select first neighbor features of each feature vector) (S103 in FIG. 25). Furthermore, the selection unit 11 executes selection processing of second neighbor feature (to select second neighbor features of each feature vector) (S104 in FIG. 25). The selection unit 11 outputs the first neighbor features and the second neighbor features to the determination unit 42.

By referring to a threshold the to compare similarity between feature vectors, the determination unit 42 estimates a density of each feature vector using the first neighbor features and the second neighbor features (selected by the selection unit 11) (S105 in FIG. 25). Next, the determination unit 42 determines feature vectors classified into the same class as each feature vector from the first neighbor features and the second neighbor features (S106 in FIG. 25). Hereinafter, feature vectors to be classified into the same class are called shift candidates.

In this case, a feature vector xj to be classified into the same class as a feature vector xi (by the determination unit 42) is determined using reference relationship of each feature vector. Concretely, the decision unit 46 decides whether the feature vector xi is included in neighbor features of the feature vector xi and whether the feature vector xj is included in neighbor features of the feature vector xj. Alternatively, the decision result 46 decides whether the feature vectors xi and xj have common neighbor feature. If above condition is satisfied, the feature vectors xi and xj are regarded as shift candidates classified into the same class. If above condition is not satisfied, the feature vectors xi and xj are not mutually regarded as shift candidates.

For example, in case of first-dimensional feature vectors $x_0 \sim x_9$ in FIG. 12, similarity not satisfying above condition is thick frame part in Table 5, i.e., similarities $S(8,j)$ and $S(9,j)$ of feature vectors x6 and x7. Accordingly, as to feature vectors x8 and x9, x6 and x7 are not shift candidates.

TABLE 5

EXPERIMENT 4 (WITH UPDATE CONTROL, WITHOUT THE SECOND NEIGHBOR FEATURE, k = 3,u = 0)

|        | x0   | x1   | x2   | x3   | x4   | x5   | x6   | x7   | x8   | x9   |
|--------|------|------|------|------|------|------|------|------|------|------|
| s(0,j) |      | 0.50 | 0.40 | 0.33 |      |      |      |      |      |      |
| s(1,j) | 0.50 |      | 0.67 | 0.50 |      |      |      |      |      |      |
| s(2,j) | 0.40 | 0.67 |      | 0.67 |      |      |      |      |      |      |
| s(3,j) | 0.33 | 0.50 | 0.67 |      |      |      |      |      |      |      |
| s(4,j) |      |      |      |      |      |      | 0.67 | 0.50 |      |      |
| s(5,j) |      |      |      |      |      | 0.67 |      | 0.67 |      |      |
| s(6,j) |      |      |      |      |      | 0.50 | 0.67 |      |      |      |
| s(7,j) |      |      |      |      |      | 0.29 | 0.33 | 0.40 |      |      |
| s(8,j) |      |      |      |      |      |      |      | 0.12 | 0.14 | 0.50 |
| s(9,j) |      |      |      |      |      |      |      | 0.11 | 0.13 | 0.50 |

The determination unit 42 creates a table to refer the determination result (S107 in FIG. 25), and outputs the table to the classification unit 13.

Next, by referring to the table (created by the determination unit 42), the classification unit 13 assigns a class ID to each feature vector and each additional feature vector (S108 in FIG. 25). The classification unit 13 outputs the class ID of each feature vector and the class ID of each additional feature vector to the control unit 14.

Next, the control unit 14 checks whether change of threshold ths or change of threshold thc is necessary (S109 in FIG. 25). If change of threshold ths or change of threshold thc is necessary (Yes at S109 in FIG. 25), the control unit 14 checks whether change of threshold ths is necessary (S110 in FIG. 25). If change of threshold ths is necessary (Yes at S110 in FIG. 25), the control unit 14 outputs thresholds ths and thc to the determination unit 42, and processing is returned to S105. If change of threshold ths is not necessary (No at S110 in FIG. 25), the control unit 14 outputs threshold thc to the determination unit 42, and processing is returned to S106. If neither change of threshold thc nor change of threshold thc is necessary (No at S109 in FIG. 25), processing is completed.

The classification result acquired by experiment 4 is shown in Table 6. This is the same classification result (Table 3) acquired by experiment 3. As to the experiment 4, even if threshold thc is set as low value (such as 0.1), the classification result does not change. On the other hand, as to the experiment 2, if threshold thc is set below 0.14, operation result of the function is "y(x8)=x7" because density of x7 is higher than density of x8. Accordingly, class ID of x4~x9 is 2, i.e., undesirable classification result (over-merging).

As mentioned-above, in the fourth embodiment, mutual reference relationship between feature vectors is taken into consideration. Accordingly, stability for threshold increases while maintaining the efficiency. Furthermore, accuracy to classify into each class more improves.

TABLE 6

|    | DENSITY | y (xi) | CLASS ID |
|----|---------|--------|----------|
| x0 | 1.57    | x1     | 1        |
| x1 | 2.06    | x2     | 1        |
| x2 | 2.13    | x2     | 1        |
| x3 | 1.87    | x2     | 1        |
| x4 | 1.82    | x5     | 2        |
| x5 | 2.06    | x5     | 2        |
| x6 | 1.95    | x5     | 2        |

TABLE 6-continued

|    | DENSITY | y (xi) | CLASS ID |
|----|---------|--------|----------|
| x7 | 1.33    | x6     | 2        |
| x8 | 1.11    | x8     | 3        |
| x9 | 1.09    | x8     | 3        |

[Modifications]

Figure 26A:
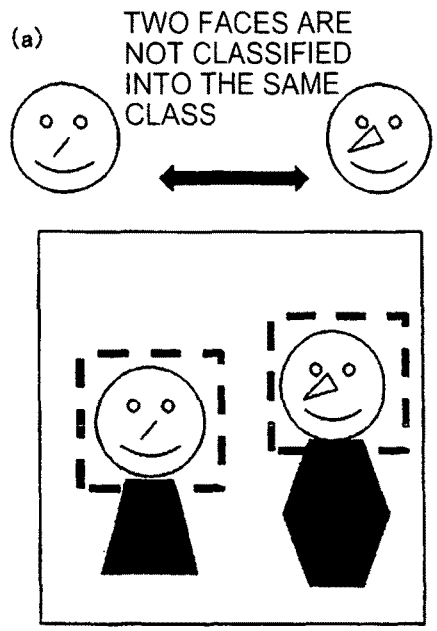
FIGS. 26A, 26B and 26C are schematic diagrams showing clustering processing of a plurality of persons included in the same image.

The decision unit 46 may decide shift candidates using individual information of the target for identification. For example, when clustering processing to classify face images of a plurality of persons is executed, each person's face (targets for identification) included in the same photograph may be controlled not to classify into the same class (FIG. 26A). Concretely, a case that feature vectors xi and xj are included in the same photograph is explained.

First, when a plurality of targets for identification is input as a signal, same photograph ID is assigned to each target. The photograph ID represents that each target is acquired from the same photograph. When a photograph ID assigned to xi is PI(xi), as to similar feature vectors xi and xj as "PI(xi)=PI(xj)", y(xi) to be converged is constrained by an equation (2). Furthermore, as to a feature vector z(xi) to which a different photograph ID is assigned, in case of "y(xi)=z(xi)", an equation (3) is applied to xi.

$$y(x_i)=x_i, y(x_j)=x_j \qquad (2)$$

$$y(x_i)=x_i \qquad (3)$$

Figure 26B:
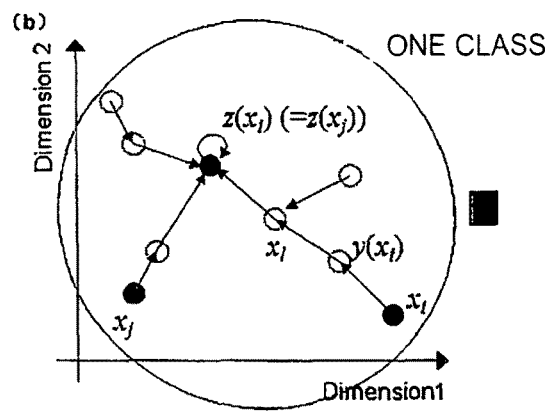
Figure 26C:
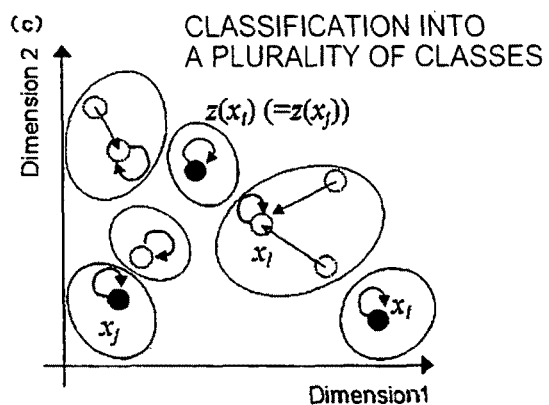

By using the equations (2) and (3), a group of features (FIG. 26B) to be classified into one class can be classified into a plurality of classes (FIG. 26C). Accordingly, classification having high accuracy can be performed without a large memory capacity.

Moreover, a user (and so on) may input information whether to classify into the same group via an input means, without the photograph ID. In this case, an update information acquisition unit (not shown in Fig.) acquires update information determined by the user, and the decision unit 46 controls not to classify targets into the same class. Furthermore, as to a target (input by the user) to be classified into another class, a different ID is assigned. In this case, by using the equation (2) as a constraint condition, the target may be decided as a shift candidate.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A signal classification apparatus, comprising:
an acquisition unit configured to acquire feature vectors (the number is N) of targets for identification from an input signal;
a first selection unit configured to select first neighbor features (the number is k ($1 \leq k \leq N$)) of each feature vector in order of higher similarity from the feature vectors;
a second selection unit configured to generate a plurality of groups from the feature vectors, each group including feature vectors of which similarity is above a first threshold, and to select second neighbor features (the number is u ($1 \leq k+u \leq N-2$)) of each feature vector in order of higher similarity from the plurality of groups, each of the second neighbor features being differently included in a group;
a determination unit configured to calculate a density of each feature vector by using a second threshold, the first neighbor features and the second neighbor features, and to select feature vectors to be classified into the same class as each feature vector from the first neighbor features and the second neighbor features, by using the density and a third threshold;
a classification unit configured to classify the selected feature vectors of targets into a plurality of classes by using a selection result of the determination unit; and
a control unit configured to control the second threshold and the third threshold.

2. The apparatus according to claim 1, further comprising:
an additional acquisition unit configured to acquire additional feature vectors (the number is M) as targets for identification; and
an update unit configured to update the first neighbor features (the number is k ($1 \leq k \leq N+M$)) and the second neighbor features (the number is u ($1 \leq k+u \leq N+M-2$)) of each feature vector by using the additional feature vectors, and to select first neighbor features (the number is k ($1 \leq k \leq N+M$)) and second neighbor features (the number is u ($1 \leq k+u \leq N+M-2$)) of each additional feature vector from the feature vectors and the additional feature vectors.

3. The apparatus according to claim 1, further comprising:
a decision unit configured to decide the feature vectors to be classified into the same class as each feature vector, by using reference relationship information of each feature vector.

4. The apparatus according to claim 1, wherein
the determination unit selects the feature vectors to be classified into the same class as each feature vector, by using the density and the second threshold.

5. The apparatus according to claim 3, wherein
the reference relationship information represents whether two feature vectors are mutually included in the neighbor features of the two feature vectors, or whether the feature vectors have the same neighbor features.

6. The apparatus according to claim 3, wherein
the acquisition unit acquires an image as the input signal, and
the reference relationship information represents that the targets are acquired from the same image.

7. The apparatus according to claim 1, further comprising:
a display unit configured to display the plurality of classes.

8. The apparatus according to claim 1, wherein
the classification unit unifies classes having similar feature vectors as one class.

9. The apparatus according to claim 8, wherein
the control unit respectively updates the second threshold and the third threshold to a new value.

10. The apparatus according to claim 2, wherein
the additional acquisition unit changes the number k of the first neighbor features, based on the number M of the additional feature vectors.

11. The apparatus according to claim 1, wherein
the determination unit stores a table representing correspondence between each feature vector and feature vectors classified into the same class as the feature vector, and classifies the feature vectors of targets by using the table.

12. The apparatus according to claim 11, wherein
the determination unit creates the table by using the selection result of the determination unit.

* * * * *